(12) United States Patent
Kipp

(10) Patent No.: US 10,924,787 B2
(45) Date of Patent: *Feb. 16, 2021

(54) SYNCHRONIZING PLAYBACK OF SEGMENTED VIDEO CONTENT ACROSS MULTIPLE VIDEO PLAYBACK DEVICES

(71) Applicant: Comcast Cable Communications, LLC, Philadelphia, PA (US)

(72) Inventor: Neill Kipp, Centennial, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 41 days.

This patent is subject to a terminal disclaimer.

(21) Appl. No.: 16/005,953

(22) Filed: Jun. 12, 2018

(65) Prior Publication Data

US 2019/0149855 A1 May 16, 2019

Related U.S. Application Data

(63) Continuation of application No. 14/963,883, filed on Dec. 9, 2015, now Pat. No. 10,021,438.

(51) Int. Cl.
*H04N 21/235* (2011.01)
*H04N 21/236* (2011.01)
(Continued)

(52) U.S. Cl.
CPC ......... *H04N 21/2387* (2013.01); *G11B 27/10* (2013.01); *H04L 61/2007* (2013.01); *H04L 65/4084* (2013.01); *H04L 65/601* (2013.01); *H04L 67/1095* (2013.01); *H04L 67/26* (2013.01); *H04N 21/2187* (2013.01); *H04N 21/242* (2013.01); *H04N 21/2407* (2013.01);
(Continued)

(58) Field of Classification Search
None
See application file for complete search history.

(56) References Cited

U.S. PATENT DOCUMENTS 6,802,019 B1 10/2004 Lauder
2004/0264577 A1 12/2004 Jung
(Continued)

OTHER PUBLICATIONS

"Is the pixel about to die?" University of Bath, Dec. 11, 2012, 3 pages.
(Continued)

*Primary Examiner* — Brian T Pendleton
*Assistant Examiner* — Jean D Saint Cyr
(74) *Attorney, Agent, or Firm* — Banner & Witcoff, Ltd.

(57) ABSTRACT

Systems, methods, and devices for synchronizing playback of segmented video content across multiple video playback devices are described herein. In example implementations, a video server provides, to one or more playback devices, an age of a playlist for the video content. A particular playback device receives fragments of the video content from the video server and schedules the video fragments for playback. If the actual playback time of a video fragment is not aligned with its scheduled playback time, then video fragment is modified, e.g., by adding video frames to or removing video frames from the video fragment. Modification of the video fragments continues until the actual playback times of the video fragments synchronize with their respective scheduled playback times.

30 Claims, 11 Drawing Sheets

(51) Int. Cl.
*H04N 21/262* (2011.01)
*H04N 21/43* (2011.01)
*H04N 21/63* (2011.01)
*H04N 7/173* (2011.01)
*H04N 21/2387* (2011.01)
*H04N 21/2665* (2011.01)
*G11B 27/10* (2006.01)
*H04L 29/12* (2006.01)
*H04L 29/06* (2006.01)
*H04L 29/08* (2006.01)
*H04N 21/2187* (2011.01)
*H04N 21/24* (2011.01)
*H04N 21/242* (2011.01)
*H04N 21/458* (2011.01)
*H04N 21/482* (2011.01)
*H04N 21/845* (2011.01)

(52) U.S. Cl.
CPC ... *H04N 21/2665* (2013.01); *H04N 21/26258* (2013.01); *H04N 21/26283* (2013.01); *H04N 21/4302* (2013.01); *H04N 21/458* (2013.01); *H04N 21/4825* (2013.01); *H04N 21/8456* (2013.01); *H04L 61/6068* (2013.01)

(56) References Cited

U.S. PATENT DOCUMENTS

| | | |
|---|---|---|
| 2005/0071881 A1 | 3/2005 | Deshpande |
| 2005/0084237 A1* | 4/2005 | Kellner, Jr. .... H04N 21/440281 386/270 |
| 2005/0158026 A1 | 7/2005 | Shin et al. |
| 2005/0286546 A1 | 12/2005 | Bassoli et al. |
| 2006/0104347 A1 | 5/2006 | Callan et al. |
| 2007/0154163 A1* | 7/2007 | Cordray ............ H04N 21/4755 386/278 |
| 2009/0147075 A1 | 6/2009 | Plant |
| 2010/0031307 A1 | 2/2010 | Toyama |
| 2011/0052136 A1 | 3/2011 | Homan et al. |
| 2011/0069223 A1 | 3/2011 | Nishikawa et al. |
| 2011/0069940 A1* | 3/2011 | Shimy ................ H04N 5/44543 386/296 |
| 2011/0078717 A1* | 3/2011 | Drummond ........ H04N 21/4788 725/14 |
| 2011/0246621 A1* | 10/2011 | May, Jr. .............. H04L 65/4084 709/219 |
| 2012/0027085 A1 | 2/2012 | Amon et al. |
| 2012/0144435 A1 | 6/2012 | Spilo et al. |
| 2012/0207215 A1 | 8/2012 | Ryu et al. |
| 2012/0254454 A1 | 10/2012 | Margush et al. |
| 2012/0293618 A1 | 11/2012 | Tsukagoshi |
| 2012/0328268 A1 | 12/2012 | Mak-Fan et al. |
| 2013/0067116 A1 | 3/2013 | Ostergren |
| 2013/0127992 A1 | 5/2013 | Saitoh |
| 2013/0239145 A1 | 9/2013 | Broome et al. |
| 2013/0278826 A1 | 10/2013 | Schlieski et al. |
| 2013/0286825 A1 | 10/2013 | Sherlock et al. |
| 2013/0308638 A1 | 11/2013 | Grossman et al. |
| 2013/0311298 A1 | 11/2013 | Ayoub |
| 2014/0049689 A1 | 2/2014 | Liang |
| 2014/0098715 A1 | 4/2014 | Morsy et al. |
| 2014/0129729 A1 | 5/2014 | Tandon |
| 2014/0168514 A1 | 6/2014 | Altmann |
| 2014/0241415 A1 | 8/2014 | Su et al. |
| 2014/0259050 A1 | 9/2014 | Goldberg |
| 2014/0282792 A1* | 9/2014 | Bao .................... H04N 21/8456 725/116 |
| 2014/0314237 A1* | 10/2014 | Cottrell .............. H04L 65/4076 381/2 |
| 2014/0321826 A1 | 10/2014 | Stelmack et al. |
| 2015/0046965 A1 | 2/2015 | Shanson |
| 2015/0049248 A1 | 2/2015 | Wang et al. |
| 2015/0094834 A1 | 4/2015 | Vega et al. |
| 2015/0095962 A1 | 4/2015 | Kim et al. |
| 2015/0121436 A1 | 4/2015 | Rango et al. |
| 2015/0121440 A1* | 4/2015 | Wong .................. H04L 65/601 725/109 |
| 2015/0201197 A1 | 7/2015 | Marlatt et al. |
| 2015/0237237 A1 | 8/2015 | Meek et al. |
| 2016/0350922 A1 | 12/2016 | Tofolo et al. |
| 2017/0229151 A1* | 8/2017 | Abecassis ........ H04N 21/42221 |
| 2017/0366856 A1* | 12/2017 | Riegel ................ H04N 21/2668 |

OTHER PUBLICATIONS

May 10, 2017—(EP) Extended Search Report—App. 16203171.0.
Aug. 22, 2019—European Office Action—EP 16203171.0.

\* cited by examiner

SYNCHRONIZING PLAYBACK OF SEGMENTED VIDEO CONTENT ACROSS MULTIPLE VIDEO PLAYBACK DEVICES

CROSS-REFERENCE TO RELATED APPLICATIONS

This application is a continuation of U.S. patent application Ser. No. 14/963,883 entitled "Synchronizing Playback of Segmented Video Content Across Multiple Video Playback Devices" and filed on Dec. 9, 2015, which is incorporated by reference in its entirety herein.

BACKGROUND

Video content may be transmitted in a variety of ways. One way involves digitizing the video content and transferring the digitized video content to a playback device in multiple packets using the Internet Protocol (IP). Video content provided using this technique is often referred to as IP video.

IP video servers may stream IP video to playback devices in real time. A playback device may connect to an IP video server at any point during a live IP video stream and begin playback. IP video is typically a pull-based technology in which a playback device requests portions of the video content from an IP video server. In response to the requests, the IP video server transmits the requested video content to the playback device. Playback devices may connect to an IP video server at slightly different times and thus receive the portions of video content at different times. As a result, playback of an IP video stream across multiple playback devices may occur at different times and thus be out of sync.

Therefore a need exists for synchronizing video streams across multiple playback devices.

SUMMARY

Some aspects of the disclosure generally relate to reproduction of video content. Various aspects of the disclosure relate to synchronizing reproduction of segmented video content across multiple playback devices.

Techniques for synchronizing playback of segmented video streams across multiple video playback devices are provided. In this way, where multiple video playback devices are deployed to a common location (e.g., a sports bar) or at different locations, playback of the video content is synchronized across those playback devices when presented to the viewers.

In example implementations, a video server is configured to provide a segmented video stream comprised of multiple fragments of video content (referred to herein as video fragments). The video server maintains a playlist identifying the currently available video fragments and updates the playlist as new video fragments become available. The video server receives from video playback devices requests for the playlist and for the video fragments. In response to requests for the playlist, the video server determines (e.g., calculates) the age of the playlist. In one example implementation, the age of the playlist is the difference between the time the video server received the playlist request and the last time the playlist was updated, e.g., to identify a new video fragment. The video server may include the age of the playlist in the response to the playlist request.

The video playback device (referred to herein as a playback device) may use the age of the playlist to modify (if necessary) one or more video fragments received from the video server. In particular, the playback device determines (e.g., calculates) an estimated live-point (or current point for time-shifted content) time of the server based on the age of the playlist and sets a scheduled playback time for the video fragments based on the estimated live-point time. The playback device then determines whether the actual playback times of the video fragments match their respective scheduled playback times. If not, the playback device modifies the video fragments until the actual playback times match the scheduled playback times. When each playback device employs this technique, playback of the video content across multiple playback devices is synchronized.

In some aspects, a playback device may modify a video fragment by adding frames to or removing frames from that video fragment. If, for example, the actual playback times of successive video fragments occur after their respective scheduled playback times, the playback device removes frames from one or more successive video fragments until the actual playback time of a video fragment matches its scheduled playback time. On the other hand, if the actual playback times of successive video fragments occur before their respective scheduled playback times, the playback device adds frames to each successive video fragment until the actual playback time of a video fragment matches its scheduled playback time.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Techniques for synchronizing playback of segmented video streams across multiple playback devices are provided. By employing the techniques described herein, playback devices deployed to a common location (e.g., a sports bar, a residence, etc.) may synchronize a segmented video stream presented to viewers on multiple displays at that location.

In some implementations, a video server that provides segmented video may update its playlist of currently available video fragments every two seconds. Playback devices may thus connect to the video server and request the playlist at any point within that two second window. As a result, playback devices may be out-of-sync by up to two seconds which is within the bounds of human visual perception. When viewing playback of a segmented video stream at a location having multiple playback devices and displays, viewers may thus easily notice the lack of synchronization.

As described in further detail below, playback devices may synchronize playback of the segmented video stream by modifying the video fragments in a way that goes unnoticed by the viewer. More particularly, the playback devices may add or remove frames from the video fragments received from the video server until the actual playback times of the video fragments match respective scheduled playback times for those video fragments. Playback of the segmented video stream may occur at 30 frames per second (fps). At this framerate, viewers may be unable to perceive the addition or removal of only a few frames each second. In other words, even if the playback devices are not precisely in sync, the techniques described herein achieve enough synchronization such that any deviations from a precise synchronization go unnoticed by the viewers.

The synchronization techniques described herein are agnostic to the particular clock time of the video server and the individual clock times of the playback devices. In other words, playback devices may synchronize playback of a segmented video stream regardless of the clock time at the video server or the respective clock times of the playback devices. As described in further detail below, a playback device estimates the live-point time of the video server in terms of its own clock time. A playback device similarly schedules playback of the video fragments in terms of its own clock time. Playback devices can thus achieve synchronization even when clock drift occurs at the video server or the individual playback devices.

Additional aspects and will be appreciated with the benefit of the additional disclosures provided in more detail below.

Figure 1:
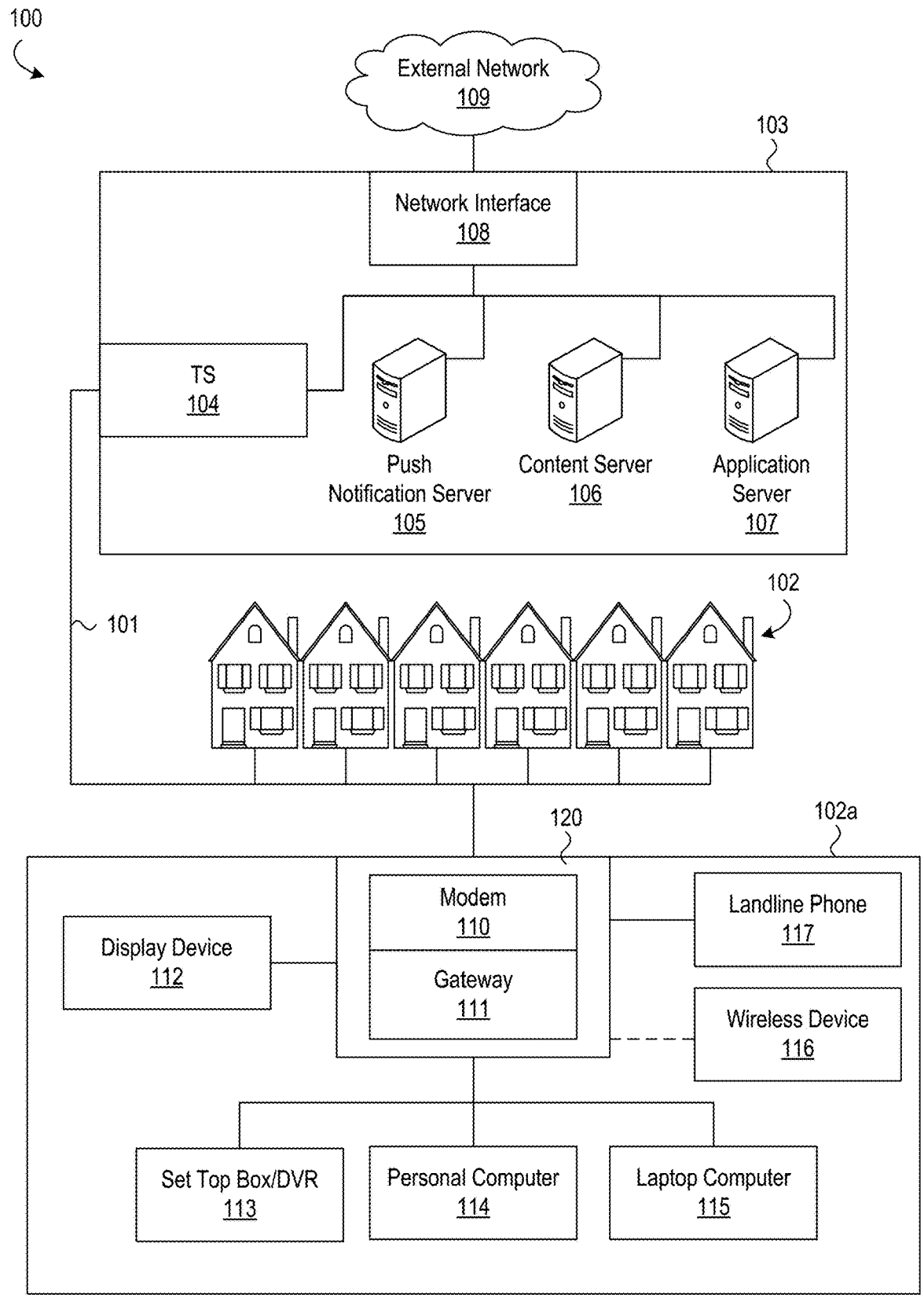
FIG. 1 depicts an example of an implementation of a communication network on which various aspects described herein can be implemented.

Referring to FIG. 1, an example of an implementation of a communication network on which various aspects described herein can be implemented is shown. FIG. 1 illustrates an example communication network 100 on which some or all of the various features described herein may be implemented. The network 100 may be any type of information distribution network, such as satellite, telephone, cellular, wireless, etc. One example may be an optical fiber network, a coaxial cable network, and/or a hybrid fiber/coax distribution network. The network 100 also may include multiple types of networks (e.g., Wi-Fi 802.11a-n, Ethernet, 3G, 4G, and 4GLTE) that interconnect. Such networks 100 use a series of interconnected communication links 101 (e.g., coaxial cables, optical fibers, wireless, etc.) to connect multiple premises 102 (e.g., businesses, homes, consumer dwellings, etc.) to a local office or head end 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the DOCSIS standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Still another application server 107 may be responsible for tracking and collecting billing data associated with various equipment at the premises 102. Although shown separately, one of ordinary skill in the art will appreciate that the push notification server 105, content server 106, and application server 107 may be combined. Further, here the push notification server 105, content server 106, and application server 107 are shown generally, and it will be understood that they may each contain computer memory storing computer-executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway device 111, such as a gateway interface device. The modem 110 may be connected to, or be a part of, the gateway device 111. The gateway device 111 may be a computing device that communicates with the modem(s) 110 to allow one or more other devices in the premises 102a, to communicate with the local office 103 and other devices beyond the local office 103. The gateway device 111 may be a set-top box (STB), digital video recorder (DVR), computer server, or any other desired computing device. The gateway device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
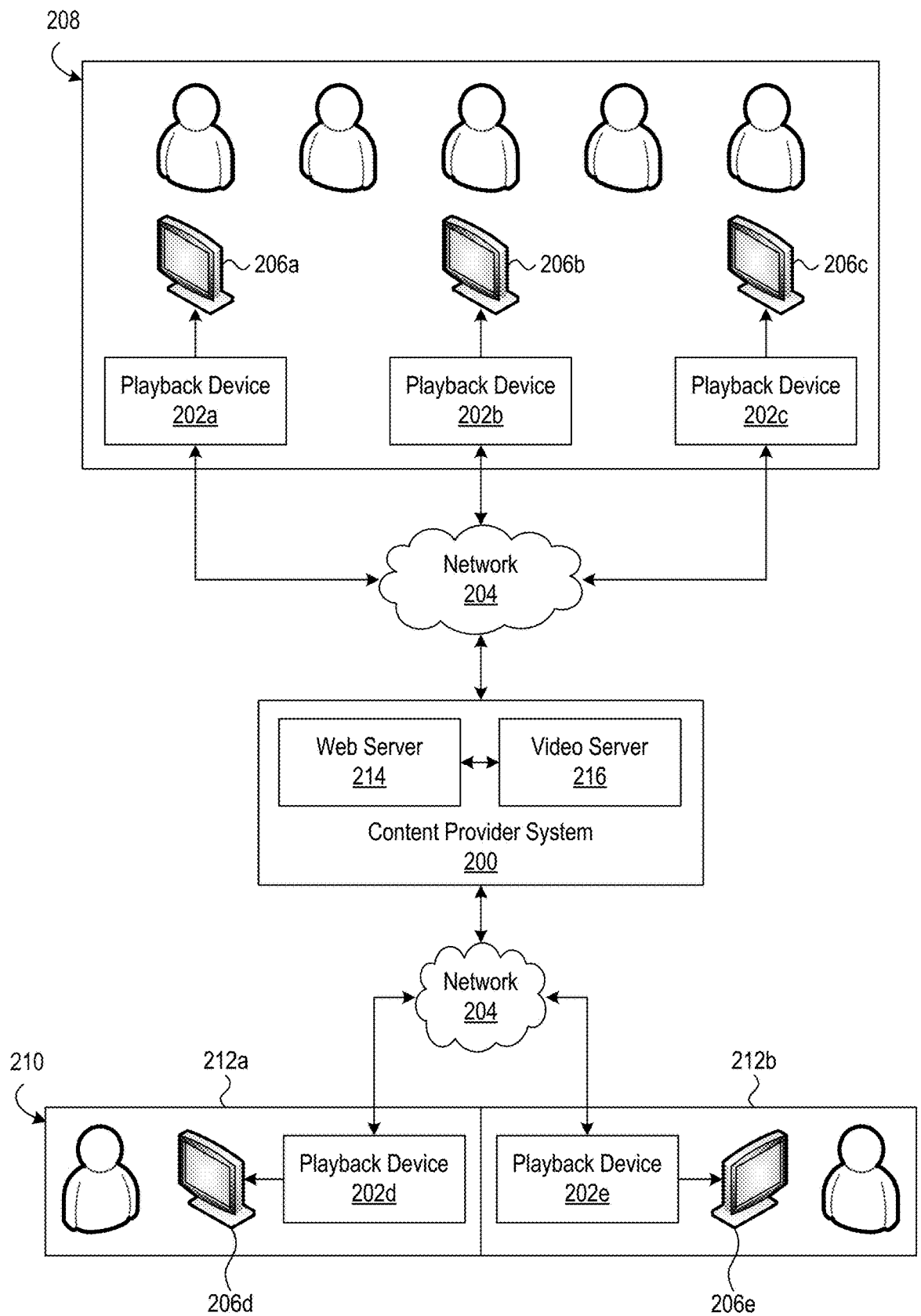
FIG. 2 depicts an example configuration of a system for synchronizing segmented video streams across multiple playback devices in accordance with various aspects described herein.

In FIG. 2, an example configuration of a system for synchronizing segmented video streams across multiple playback devices is shown. As seen in FIG. 2, a content provider system 200 is in signal communication with multiple playback devices 202a-e (collectively 202) via a network 204. Each playback device 202a-e is connected to a respective display device 206a-e (collectively 206). In FIG. 2, playback device 202a is connected to display device 206a; playback device 202b is connected to display device 206b; playback device 202c is connected to display device 206c; playback device 202d is connected to display device 206d; and playback device 202e is connected to display device 206e.

As also seen in FIG. 2, some of the playback devices are co-located with one another. For example, playback devices 202a, 202b, and 202c are co-located at a site 208, and playback devices 202d and 202e are similarly co-located with each other at a site 210. Co-located playback devices may be arranged such that their respective display devices are or are not within view of each viewer. At site 208, for example, each of the display devices 206a-c are within view of the viewers. Such arrangements may be found, for example, at sports bars, classrooms, meeting rooms, and other locations where it may be desirable to have multiple display devices presenting the same content. In contrast, at site 210, the co-located playback devices 202d-e are arranged such that their respective display devices are not within view of each viewer, e.g., within different areas 212a-b of the site 210. At site 210, for example, playback device 202d and display device 206d are located in area 212a while playback device 202e and display device 206e are located in area 212b. These arrangements may be found, for example, at hotels, apartment buildings, residences having display devices in different rooms (e.g., upstairs and downstairs), and other locations in which the playback devices may be within vicinity of each other but present the video content to different viewers. It will be appreciated upon review of the additional disclosures below, however, that the techniques described herein may synchronize playback of segmented video streams at playback devices that are not co-located with each other, i.e., not within vicinity of each other. For example, in one implementation playback of video content may be synchronized across stadium video boards and other types of devices such as mobile devices (e.g., smartphones of attendees) and fixed devices (e.g., television screens installed throughout the stadium). It will also be appreciated that the techniques described herein can advantageously provide synchronized playback across relatively large distances, e.g., across town, intrastate, and interstate. In one scenario, for example, two viewers may call each other on the telephone with the same program airing in the background. If the playback devices at each location employ the synchronization techniques described, then playback at one location may not get ahead of playback at the other location. In this way, hearing noticeable events over the phone prior to receiving them at the local playback device can be advantageously avoided.

The content provider system 200, in this example, includes a web server 214 and a video server 216. The web server 214 is configured to handle and process the requests from the playback devices 202. Such requests may include, for example, requests for the current playlist from the video server 216 as well as requests for the video fragments currently available from the video server. The web server 214 may forward the requests received from the playback devices 202 to the video server 216 and receive from the video server the playlist or video fragments requested. The web server may then package the playlist or video fragments requested in a response that is delivered to the playback devices via the network 204. Although FIG. 2 depicts the web server 214 and the video server 216 as separate components of the content provider system 200, in example implementations a single device may include both a web server and a video server.

The network 204 may include a wide area network (WAN) such as the Internet and utilize various Internet-related protocols for delivering segmented video content to the playback devices 202. For example, HTTP (HyperText Transfer Protocol) may be utilized to transmit segmented video content from a video server to a playback device. The network 204 may also include a cellular network that uses cellular communication technologies to deliver segmented video content from a video server to a playback device.

The playback devices 202 may be any type of device configured to receive segmented video content, generate a video signal based on the segmented video content received, and output the video signal generated to a display device. Examples of playback devices include set-top boxes, digital video recorders, personal computers, desktop computing devices, laptop computing devices, tablet computing devices, hand-hand computing devices, mobile telephones, video game machines, virtual reality headsets, "smart" televisions, IPTV receivers, portable media players, console media players, dongles, microconsoles, information appliances, video graphics cards, and other types of devices configured to generate a video signal based on segmented video content received.

Playback devices may receive content via a wired or wireless connection. For example, a coaxial cable may provide the video content to a modem, and a playback device may be connected to the modem. A playback device may be connected to the modem directly via an Ethernet connection or indirectly via a network router that is connected to the modem. The playback device may be connected to the network route via a wired connection (e.g., via an Ethernet connection) or via a wireless connection (e.g., via an 802.11 wireless communication session). The coaxial cable may also provide the video content directly to the playback device.

The display devices 206 may be any type of device configured to receive a video signal and output visual images corresponding to that video signal. Examples of display devices include televisions, computer monitors, computer screens, touchscreens, video projectors, head-up displays, head-mounted displays, digital billboards, and other types of devices configured to generate visual images from a video signal received.

Although the playback devices 202 are shown to be separate from their respective display devices 206, this need not be the case. In example implementations, a single device may incorporate both the playback device and the display device. Examples of devices that include both the playback device and the display device include mobile telephones (i.e., "smartphones"), tablet computing devices, laptop computing devices, desktop computing devices, and other types of devices configured to receive the segmented video content, generate a video signal based on the segmented video content received, and output visual images corresponding to that video signal.

Figure 3A:
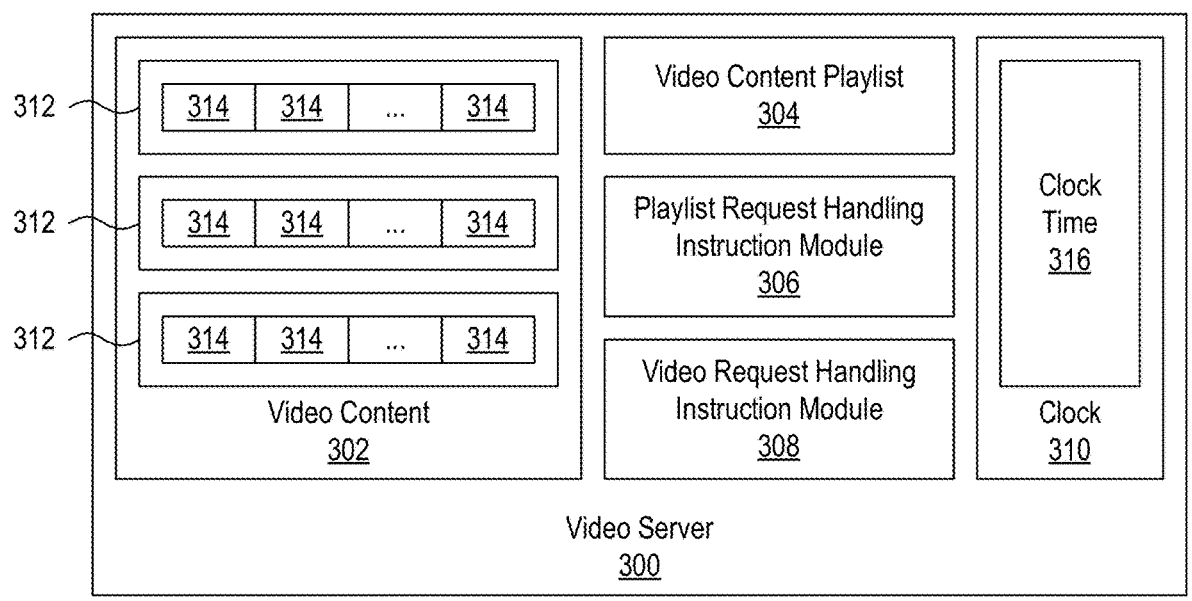
FIG. 3A depicts an example of an implementation of a computing device such as a video server, in accordance with aspects described herein.

FIG. 3A depicts an example of an implementation of a computing device, such as a video server, 300 configured to provide segmented video content to playback devices. As seen in FIG. 3A, the video server 300, in this example, includes video content 302, a video content playlist 304, a playlist request handling instruction module 306, a video request handling instruction module 308, and a clock 310.

The playlist request handling instruction module 306 includes instructions configured to process and respond to a request for the video content playlist 304. The playlist request handling instruction module 306, in this example, processes requests for playlists received at the video server 300. In some implementations, a video server may provide multiple segmented video streams and thus maintain a respective playlist for each segmented video stream. Accordingly a playlist request may identify, in this example, a particular playlist that is requested. The playlist request handling instruction module 306 may thus extract from the playlist request an identifier for the playlist requested (e.g., a playlist name, a playlist ID number, etc.) and retrieve the requested playlist based on that identifier. In other implementations, the video server may only provide one segmented video stream, and the playlist request may simply request whatever playlist is currently available at the video server. Having retrieved a requested playlist, the playlist request handling instruction module 306 may then prepare a response that includes as its payload the playlist retrieved. The playlist request handling instruction module 306 may also include in the payload of the response the age of the playlist. As described herein, the age of the playlist, in this example, is the duration between the live-point time of the video server and the time the video server received the playlist request. As also described herein, the live-point time of the video server is the time the playlist was last updated when a new video fragment became available. The playlist request handling instruction module 306 may thus also calculate the age of the playlist when processing a playlist request received from a playback device and include the playlist age in the response sent back to the playback device. Throughout the segmented video stream, the playlist request handling instruction module 306 may process multiple requests for the playlist from the same playback device as well as multiple requests for the playlist from different playback devices. In some implementations, a playback device may only request the playlist once when the playback device first connects to the video server. The instructions of the playlist request handling instruction module 306 are computer-executable instructions stored in memory at the video server 300 and are executable by one or more processors of the video server.

The video request handling instruction module 308 includes instructions configured to process and respond to a request for the video content 302. The video request handling instruction module 308, in this example, processes requests for video fragments received at the video server. In some example implementations, the video fragment request may identify one or more particular video fragments, e.g., by video fragment sequence number or ID number. In other implementations, the video fragment request may simply request whatever video fragments are currently available from the video server. In some implementations, a video fragment request may identify the last video fragment the playback device received, and the video request handling instruction module 308 may retrieve the available video fragments that are subsequent to the video fragment identified. The video request handling instruction module 308 may thus retrieve the requested video fragments (e.g., the n number of most recent video fragments) and prepare a response that includes as its payload the video fragments received. Throughout the segmented video stream, the playlist request handling instruction module 306 may process multiple requests for video fragments from one or more playback devices. The instructions of the video request handling instruction module 308 are likewise computer-executable instructions stored in memory at the video server 300 and executable by one or more processors of the video server.

The video content 302, in this example, is segmented video content and thus has been segmented into multiple video fragments 312. Each video fragments includes a sequence of frames 314. For the sake of clarity, some of the frames in the video fragments 312 have been omitted from FIG. 3A.

The number of frames 314 in a video fragment 312 may vary across implementations. In example implementations, the segmented video content may have a framerate of 30 fps and be segmented into fragments having a duration of 2 seconds (s). This type of video fragment thus has 60 total frames (i.e., 30 frames/second×2.0 seconds=60 frames). In other example implementations, the video fragments may have a duration of, e.g., 10 s or 12 s. Each frame 314 of a video fragment 312 may be at the same resolution and aspect ratio. As described in further detail below, various resolutions and aspect ratios may be selectively employed for the segmented video content. It will be appreciated with the benefit of this disclosure that a video server may provide multiple streams of segmented video content in which the fragment duration, resolution, and aspect ratio varies between each stream of segmented video content. The frames 314 of the video fragment 312 may be quantized in order to compress the size of the frames.

The clock 310 maintains a clock time 316 for the video server 300. As noted above, the playlist request handling instruction module 306 includes the age of the video content playlist 304 in the response to a request for the video content playlist. In example implementations, the age of the playlist is the difference between the time the video server received the playlist request and the last time the playlist was updated. The video server 300 may thus store, for each video fragment 312, a reading of the clock time 316 that video fragment became available. Additionally or alternatively, the video server 300 may store a "last update" time and update the "last update" time with a reading of the clock time 316 whenever a new video fragment becomes available. As an example, the clock time 316 of the video server 300 may be 16:30:31.700 when it receives a request for the video content playlist 304. If, in this example, the "last update" time is 16:30:30.500, then the age of the video content playlist 304 is 1.2 s, i.e., 16:30:31.700 minus 16:30:30.500.

It will thus be recognized that the age of the playlist may depend on how long it takes for new video fragments to become available. For example, if a new video fragment becomes available every two seconds, then a video content playlist may be updated every two seconds. Since a video server may receive requests for the video content playlist anywhere within this two second window, then, in this example, the age of the video content playlist will range between zero and two seconds (0-2 s). Additional examples will be appreciated with the benefit of this disclosure.

Figure 3B:
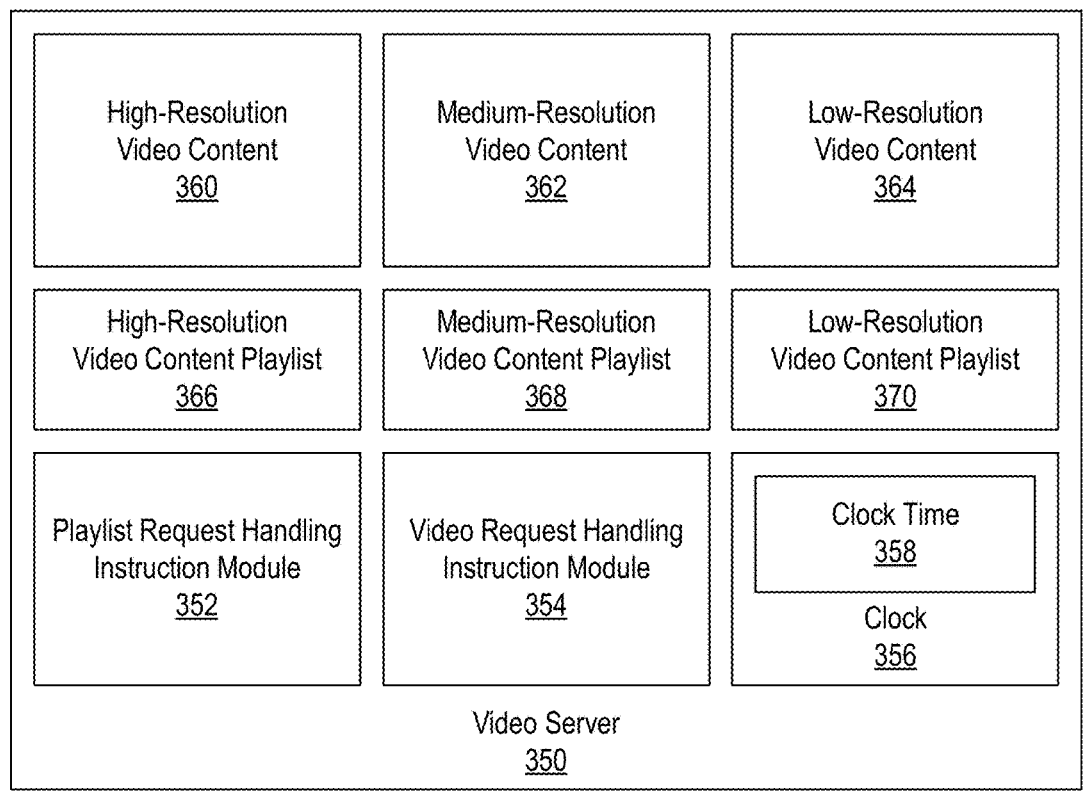
FIG. 3B depicts another example of an implementation of a computing device such as a video server, in accordance with aspects described herein.

FIG. 3B depicts another example of an implementation of a video server 350. Like the video server 300 discussed above with reference to FIG. 3A, the video server 350 includes a playlist request handling instruction module 352, a video request handling instruction module 354, and a clock 356 that maintains a clock time 358 for the video server. The playlist request handling instruction module 352 is similar to the playlist request handling instruction module 306 discussed above and is thus configured to process and respond to requests for a video content playlist. The video request handling instruction module 354 is similar to the video request handling instruction module 308 discussed above and is thus configured to process and respond to requests for video content.

The video server 350, in this example, is configured to provide adaptive bitrate video to playback devices. Accordingly, the video server 350 includes video content encoded at different bit rates. More particularly, the video server 350, in this example, includes high-resolution video content 360, medium-resolution video content 362, and low-resolution video content 364. The high-, medium-, low-resolution video content 360-364 in FIG. 3B need not be encoded at any particular bit rate. The high-resolution video content 360 thus refers to video content encoded at a bit rate that is relatively higher than the bit rate used to encode other video content stored at the video server 350; the low-resolution video content 364 thus refers to video content encoded at a bit rate that is relatively lower than the bit rate used to encode other video content stored at the video server 350; and the medium-resolution video content 362 thus refers to video content encoded at a bit rate that is relatively higher than the bit rate used to encode some video content at the video server and relatively lower than the bit rate used to encode other video content at the video server. Although the video server 350 is shown with three types of adaptive bit rate video content (e.g., high, medium, and low), other implementations may include more or fewer types of adaptive bit rate video content encoded at varying bitrates.

The video server 350 also includes playlists for each of the adaptive bitrate video content available. As seen in FIG. 3B, the video server 350, in this example, includes a high-resolution video content playlist 366 for the high-resolution video content 360, a medium-resolution video content playlist 368 for the medium-resolution video content 362, and a low-resolution video content playlist 370 for the low-resolution video content. Although not shown in FIG. 3B, the video server 350 may include a master playlist that identifies the different types of adaptive bitrate video content available from the server 350. In such implementations, the playlist request handling instruction module 352 may be configured to provide the master playlist to a playback device in response to an initial playlist request from the playback device. The playback device may select one of the types of adaptive bit rate video content identified in the master playlist (e.g., the high-, medium-, or low-resolution video content) and request the corresponding playlist for the selected type of adaptive bitrate video content.

The respective clocks 310 and 356 of the video servers 300 and 350 may measure the respective clock times 316 and 358 on the scale of milliseconds (ms). For convenience, the clock times are referred to herein according to the 24-hour format of HH:MM:SS.sss, where HH represents the hour from 0-23, MM represents the minute from 0-59, SS represents the second from 0-59, and sss represents the millisecond from 0-999. An example clock time according to this format is 16:30:30.500.

Figure 4:
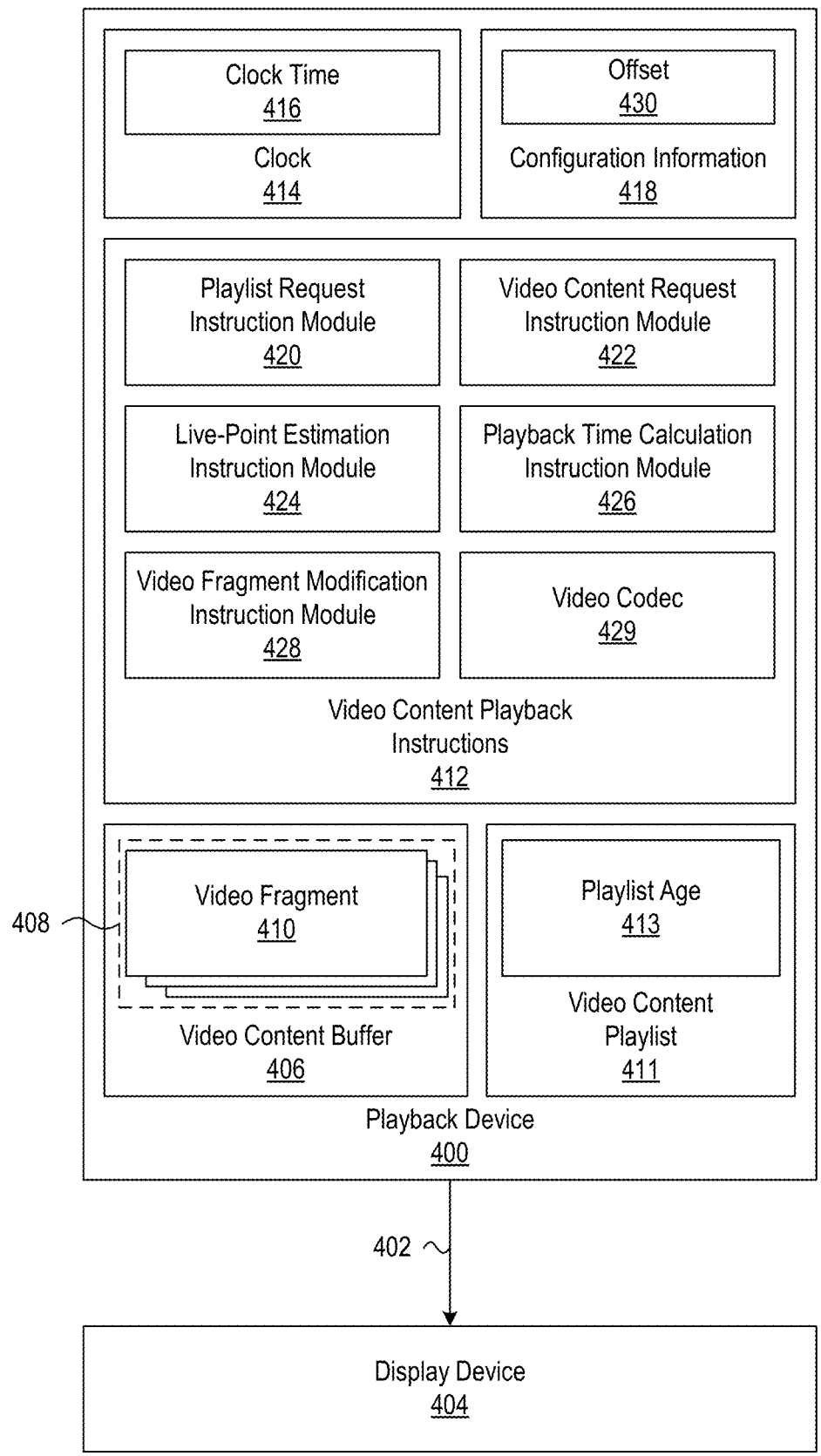
FIG. 4 depicts an example of an implementation of a playback device in accordance with aspects described herein.

FIG. 4 depicts an example of an implementation of a playback device 400. The playback device 400, in this example, is configured to obtain segmented video content from a video server, generate a video signal 402 corresponding to that video content, and provide that video signal to a display device 404. The playback device 400 is also configured to perform the techniques described herein for synchronizing playback of the segmented video content. As noted above, although the playback device 400 and the display device 404 are depicted as separate devices in FIG. 4, in other implementations a single device may be configured to obtain the segmented video content, generate the video signal, and present visual images corresponding to that video signal.

The playback device 400, in this example, includes a video content buffer 406 configured to store a set 408 video fragments 410, a video content playlist 411 that includes the age 413 of the video content playlist, video content playback instructions 412, a clock 414 that provides a clock time 416 for the playback device, and configuration information 418. The playback device 400 may include additional components which will be appreciated with the benefit of this disclosure but have been omitted from FIG. 4 for the sake of clarity.

As the playback device 400 requests, receives, and processes the set 408 of video fragments 410 during playback, the playback device may update the video content buffer 406 with new video fragments 410 at regular or irregular intervals. If the playback device 400 is configured for adaptive bit rate streaming, the particular video fragments 410 stored in the video content buffer during playback may vary between high-, medium-, and low-resolution video fragments.

The video content playback instructions 412 are configured to initiate and carry out playback of the segmented video content received from a video server. The video content playback instructions 412 are computer-executable instructions stored in memory at the playback device 400 and are executable by one or more processors of the playback device. Playback of the segmented video content at the playback device 400, in this example, includes carrying out the techniques that achieve synchronized playback of the segmented video content with other playback devices that are similarly configured. To this end, the video content playback instructions 412, in this example, include a playlist request instruction module 420, a video content request instruction module 422, a live-point estimation instruction module 424, a playback time calculation instruction module 426, a video fragment modification instruction module 428; and a video codec 429. The video content playback instructions 412 may include additional instructions or instruction modules which will be appreciated with the benefit of this disclosure but again have been omitted from FIG. 4 for the sake of clarity.

The playback device 400 may utilize the video codec 429 (coder-decoder) to process the video fragments. More particularly, the playback device 400 may utilize a video codec to decode the video fragments and obtain the raw, uncompressed video data used to generate the video signal sent to the display device. Although the playback device 400 is depicted in FIG. 4 as having only a single codec, this and other playback devices may include multiple video codecs for playback of video content that has been encoded in a variety of formats.

During playback, the video content playback instructions 412 may take readings of the current clock time 416 which are used, e.g., to estimate the live-point estimation time and calculate the playback time for the video fragments as described above. Like the clocks discussed above with reference to FIGS. 3A-B, the clock 414 may provide its clock time 416 on the scale of milliseconds.

The following summary is provided as a general introduction to an example implementation of the synchronization process that occurs during playback of the segmented video content at the playback device 400. The synchronization process will be described in further detail below with reference to FIGS. 5-7 and FIGS. 8A-B. The playback device 400, in this example, first connects to a video server that provides an segmented video content stream. The playback device 400 requests from the video server the video content playlist 411 for the segmented video content stream. In response to this request, the playback device 400 receives the video content playlist 411 along with the age of the video content playlist. As noted above, the age of the video content playlist 411, in this example, is the difference between the time the video server received the request and the last time the playlist was updated. The last time the playlist was updated is referred to herein as the live-point time. The playback device 400 then estimates the live-point time of the video server based on the age of the video content playlist 411 received. As described in further detail below, estimating the live-point time may include calculating the duration of the playlist request, e.g., the duration between sending the request for the video content playlist 411 and receiving the response. The playback device 400 then downloads the video fragments 410 currently available from the video server. For each video fragment 410 downloaded, the playback device 400 calculates a scheduled playback time that is based on the estimated live-point time. As also described in further detail below calculating the scheduled playback time may include applying an offset (e.g., 2-3 seconds). The estimated live-point time and the scheduled playback times are in terms of the clock time 416 of the playback device 400. For each video fragment 410, the playback device 400 compares the actual playback time to the scheduled playback time. If the actual playback time does not match the scheduled playback time, then the playback device 400 modifies the video fragment 410 by adding or dropping frames from the video fragment. As playback progresses and the playback device 400 adds or drops frames from the video fragments 410, the actual playback times of the video fragments approach their scheduled playback times. When multiple playback devices operate in this fashion, playback of a segmented video stream across those playback devices becomes synchronized. Synchronization across the multiple playback devices occurs as a result of each playback device scheduling playback of the video fragments based on their estimations of the live point time of the video server and modifying their respective video fragments until the actual playback times of the video fragments align with the scheduled playback times. Additional details are provided below.

The playlist request instruction module 420, in this example, is configured to obtain, from the video server, one or more playlists for the segmented video content available from that video server. The playlist request instruction module 420 may prepare and transmit a request to the video server for the video content playlist 411. The request may be, e.g., a request for a list of playlists available from the video server, a request for a particular playlist available from the video server, or a request for whatever playlist is currently available at the video server. For example, the playlist request instruction module 420 may cause the playback device to first request a list of playlists available from a video server, receive a response that identifies the available playlists, select one of the playlists, and then request the playlist selected.

If, for example, the playback device is configured for adaptive bitrate streaming, the initial playlist request sent to the video server may be a request for a master playlist that identifies the various types of adaptive segmented video content available (e.g., high-, medium-, and low-resolution video content). A subsequent playlist request may thus be a request for one of the adaptive bitrate video content playlists. The playlist request instruction module 420 may also be configured to determine, during playback, whether relatively higher-resolution or relatively lower-resolution segmented video content should be utilized due to, e.g., an improved or degraded network and/or playback conditions. If, for example, the network and/or playback conditions improve during playback, the playlist request instruction module 420 may request from a video server the playlist for relatively higher-resolution video content in order to continue playback of the segmented video stream using relatively higher-resolution segmented video content. On the other hand, if the network and/or playback conditions degrade during playback, then the playlist request instruction module 420 may request from a video server the playlist for relatively lower-resolution video content in order to continue playback of the segmented video stream using relatively lower-resolution segmented video content. It will be appreciated a playback device configured for playback of adaptive bitrate video content may switch back and forth between using relatively higher-resolution and relatively lower-resolution video content throughout playback as the network and/or playback conditions change. Network conditions include, for example, the bandwidth available on the network connection between the playback device and the video server. Playback conditions include, for example, the capacity of one or more processors of the playback device.

The video content request instruction module 422, in this example, is configured to obtain, from the video server, the segmented video content selected for playback. The video content request instruction module 422 may prepare and transmit a request to the video server for one or more video fragments 410. The request may be, e.g., a request for particular video fragments or a request for whatever video fragments are currently available from the video server. Upon receipt of the video fragments 410, the video content request instruction module 422 may store the video fragments in the video content buffer 406. The video content request instruction module 422 may configure the requests for video fragments based on the video content playlist 411, e.g., the particular video fragments identified in the video content playlist. Throughout playback, the video content request instruction module 422 may request new video fragments at regular or irregular intervals.

The playback device 400 may utilize the HTTP (or any other protocol) to request and receive the video content playlist 411 and video fragments 410. Accordingly the requests for the video content playlists and the requests for the video fragments may be HTTP requests. An HTTP request for a video content playlist, for example, may thus include, e.g., an identifier for a particular video content playlist requested or an indication to provide a video content playlist is currently available. The corresponding response may be an HTTP response in which the payload of the response includes the video content playlist and the age of the video content playlist. An HTTP request for one or more video fragments may thus include, e.g., one or more identifiers for the video fragments requested, a number of video fragments requests (e.g., the last x number of video fragments available), or an indication to provide whatever video fragments are currently available. The corresponding response may be an HTTP response in which the payload of the response includes the video fragments. Additional examples will be appreciated with the benefit of this disclosure.

The live-point estimation instruction module 424, in this example, is configured to estimate the live-point time of the video server. The live-point estimation instruction module 424, in this example, estimates the live-point time of the video server (LivePointTime$_{serv}$) in the units of the clock time 416 at the playback device 400. In example implementations, the live-point estimation instruction module 424 calculates the estimated live-point time of the video server as follows. Having requested and received the video content playlist 411 and playlist age 413, the live-point estimation instruction module 424 estimates the current time of the video server (EstCurrentTime$_{serv}$) when the playback device 400 receives the video content playlist 411 requested. The estimated current time of the video server may thus be based on the round-trip time (RTT) associated with requesting and receiving the video content playlist 411, i.e., the response latency of the playlist request. Accordingly, the RTT may be the difference between the time the playback device 400 sent the playlist request (Time$_{req}$) and the time the playback device 400 received the response (Time$_{resp}$), i.e., RTT=Time$_{resp}$−Time$_{req}$. The live-point estimation instruction module 424, in this example, assumes the upstream and downstream propagation times to be the same. Accordingly, live-point estimation instruction module 424 subtracts half of the RTT from the time the playback device received the video content playlist 411 in order to obtain the estimated current time of the video server, i.e., EstCurrentTime$_{serv}$=Time$_{resp}$−(RTT÷2). To obtain the estimated live-point time, the live-point estimation instruction module then subtracts the playlist age 413 (PlaylistAge) from the estimated current time of the video server, i.e., LivePointTime$_{serv}$=EstCurrentTime$_{serv}$−PlaylistAge. As described in further detail below, the playback device utilizes the estimated live-point time of the video server to schedule playback of the video fragments 410 received from the video server.

An example of estimating the live point time of a video server is as follows. A video server located in St. Louis initiates playback of segmented video content at server clock time 15:30:30.000. New video fragments become available at the video server every two seconds. Accordingly the video server updates its video content playlist every two seconds. A playback device located in Atlanta requests the video content playlist from the video server at device clock time 16:30:31.500. The video server receives the playlist request at server clock time 15:30:32.600. The video server determines it last updated the video content playlist at server clock time 15:30:31.400. The video server determines the age of its video content playlist is 1.2 s (i.e., 15:30:32.600−15:30:31.400=1.2 s). The video service includes the playlist age (e.g., 1.2 s) with the video content playlist in the response to the playback device. The playback device receives the response at device clock time 16:30:31.700. The playback device calculates the round-trip time for the playlist request to be 0.2 s (i.e., 16:30:31.700−16:30:31.500=0.2 s). The playback device estimates the current server time to be, in device clock time, 16:30:31.600 (i.e., 16:30:31.700−(0.2 s÷2)=16:30:31.700−0.1 s=16:30:31.600). The playback device thus estimates the live point time of the video server to be, in device clock time, 16:30:30.400 (i.e., 16:30:31.600−1.2 s=16:30:30:400).

The upstream and downstream propagation times for the round-trip time (RTT) need not be assumed to be the same. In example implementations, techniques may be employed to obtain a more precise estimate of the downstream propagation time used to estimate the current time of the video server once the playback device receives the response.

The playback time calculation instruction module 426, in this example, is configured to calculate a scheduled playback time (Playback$_{sched}$) for each of the video fragments during playback of the segmented video content. The playback time calculation instruction module 426 calculates a scheduled playback time for one or more of the video fragments 410 based on the estimated live-point time of the video server (LivePointTime$_{serv}$). The playback time calculation instruction module 426 may also calculate the scheduled playback time for one or more of the video fragments 410 based further on the duration of the video fragments (Duration$_{frag}$).

In example implementations, the playback time calculation instruction module 426 may schedule the video fragments received from the video server for immediate playback at the playback device 400. In other implementations, the playback time calculation instruction module 426 may calculate the scheduled playback times for the video fragments based on an offset 430 stored at the playback device 400 (Offset). The offset 430 may, for example, be part of the configuration information 418 for the playback device. The offset 430 may indicate an amount of time the playback device should delay playback of the video fragments at the playback device 400 (e.g., 2-3 seconds). To ensure synchronization across multiple co-located playback devices, the offset may be the same at each of those co-located playback devices. The duration of the offset may, in some example implementations, depend on the quality of the connection between the video server and the playback devices. When the quality of the connection is relatively good, the offset may be, for example, around 500 ms.

The playback device 400 may store the offset 430 in various ways. In example implementations, the playback device 400 may store the configuration information 418 including the offset 430 in a configuration file saved to memory of the playback device. In example implementations, the playback device 400 may store the configuration information 418 including the offset 430 at a dedicated memory location of the playback device. The configuration information 418 including the offset 430 may be updateable locally or remotely. For example, a user may modify the configuration information 418 including the offset 430 via a user interface generated by the playback device 400 and sent to a display device for presentation to the user. As another example, a user may connect a storage device to a local data port of the playback device 400 (e.g., a USB port) and overwrite the existing configuration file with a new configuration file stored on the storage device. As a further example, the configuration information 418 including the offset 430 may be update remotely via a network interface of the playback device 400 (e.g., by the content provider system). Additional examples will be appreciated with the benefit of this disclosure.

The playback time calculation instruction module 426 may calculate the scheduled playback time for a video fragment 410 based on the scheduled playback time for the preceding video fragment and the duration of the preceding video fragment. For example, the i$^{th}$ video fragment 410 may be scheduled for playback based on the scheduled playback time and duration of the (i−1)$^{th}$ video fragment, (i.e., Playback$_{sched\_i}$=Playback$_{sched\_i-1}$+Duration$_{frag}$). As noted above, the playback device 400 may immediately start playback of the first video fragment 410 in a sequence of video fragments received from the video server or begin playback of that video fragment after a designated offset. The playback time calculation instruction module 426 may thus schedule subsequent video fragments in the sequence of video fragments as described above.

A concrete example of scheduling video fragments for playback is as follows. The example below assumes a slight delay of, e.g., 100 ms between receiving a sequence of requested video fragments at the playback device and initiating playback of the first video fragment. This delay may be attributable to decrypting the video fragment and preparing the video codec for playback. Other implementations may observe longer or shorter durations. A playback device estimates the live-point time of a video server (LivePointTime$_{serv}$) to be, in device clock time, 13:35:30.500. The offset of the playback device, in this example, is 3.0 s. The playback device requests a sequence of video fragments from the video server and receives the requested video fragments at device clock time 13:35:34.500. The duration of the video fragments, in this example, is 2.0 s. The playback device schedules the first video fragment for playback at device clock time 13:35:33.500 which is the estimated live-point time plus the offset time (i.e., Playback$_{sched\_1}$=LivePointTime$_{serv}$+Offset=13:35:30.500+3.0 s=13:35:33.500). The playback device schedules the second video fragment for playback at 13:35:35.500 which is based on the scheduled playback time of the first video fragment and the fragment duration (i.e., Playback$_{sched\_2}$=Playback$_{sched\_1}$+Duration$_{frag}$=13:35:33.500+2.0 s=13:35:35.500). The playback device continues to schedule subsequent video fragments based on the scheduled playback time of its preceding video fragment and the fragment duration (i.e., Playback$_{sched\_i}$=Playback$_{sched\_i-1}$+Duration$_{frag}$).

It will be recognized that some of the scheduled playback time in the example above are before the device clock time when the playback device received the video fragments. For example, the video fragments were received at device clock time 13:35:34.500 while first video fragment is scheduled for playback at device clock time 13:35:33.500. Accordingly, the actual playback time of the first video fragment, in the example above, may be later than its scheduled playback time. In other words, playback of this example video fragment will be late. It will also be recognized that, in some circumstances, the actual playback time of one or more video fragments may occur before their respective scheduled playback times, i.e., playback of one or more video fragments may be early. Furthermore, the playback device 400, in some implementations, may assess the actual playback time upon actual playback of a video fragment. Additionally or alternatively, the playback device 400 may be configured to determine when a video fragment will actually begin playback and use that time as the actual playback time for the video fragment. As described in further detail below, the playback device 400, in this example, is configured to modify the video fragments as needed until the actual playback times of the video fragments align with the respective scheduled playback times for those fragments.

The video fragment modification instruction module 428, in this example, are configured to determine whether the video fragments should be modified and, if so, how the video fragments should be modified. In example implementations, the video fragment modifications instruction module 428 may also perform the modification. Modifying a video fragment includes adding frames to or removing frames from the video fragment. As noted above the addition or removal of a few frames (e.g., 1-3 frames) per second of video may be outside the limits of human perception. Accordingly, the playback device 400 may add or remove a few frames per video fragment until the actual playback times of the video fragments align with the scheduled playback times.

Upon playback of a video fragment 410, the video fragment modification instruction module 428, in this example, compares the actual playback time of that video fragment to its scheduled playback time. If the video fragment modification instruction module 428 determines the actual playback time is after the scheduled playback time (i.e., the video fragment is late), then the video fragment modification instruction module 428 determines frames should be removed from the video fragment. On the other hand, if the video fragment modification instruction module 428 determines the actual playback time of the video fragment is before the scheduled playback time (i.e., the video fragment is early), then the video fragment modification instruction module 428 determines frames should be added to the video fragment.

The video fragment modification instruction module 428 may also determine how many frames should be added to or removed from a video fragment. In example implementations, the video fragment modification instruction module 428 may add or remove the same number of frames (e.g., 2 frames) for each video fragment. In other implementations, the video fragment modification instruction module 428 may select from a range of frames (e.g., 1-3 frames) to add or remove. Accordingly, the video fragment modification instruction module 428, in this example, may select for a first video frame a first number of frames to add or remove (e.g., 2 frames) and select for a second video fragment a second number of frames to add or remove (e.g., 3 frames).

In example implementations, the video fragment modification instruction module 428 may perform the modification of a video fragment and/or provide information that indicates how the video fragment should be modified. In some implementations, the video fragment modification instruction module 428 may modify a video fragment by specifying how many frames should be added to or removed from a video fragment and invoking functionality that adds or removes the specified number of frames. An example of a function prototype in this regard may be, e.g., modifyVideoFragment(VideoFragment fragment, int frames), where 'fragment' refers to the video fragment to modify and 'frames' refers to the number of frames to add (e.g., +3 frames) or remove (e.g., −3 frames).

Additionally or alternatively, the video fragment modification instruction module 428 may modify a video fragment by specifying a duration for a video fragment and invoking functionality that adds or removes frames as needed to achieve the specified duration based on the framerate of the video fragment. An example of a function prototype in this regard may be, e.g., setDuration(VideoFragment fragment, double duration), where 'fragment' refers to the video fragment to modify and 'duration' refers to the desired duration for the video fragment. For example, at 30 fps, humans may be unable to perceive, per second of video, the addition or removal of one-tenth to one-fifth of a second worth of frames. At 30 fps, one-tenth of a second worth of frames amounts to 3 frames (i.e., 30 frames/second×0.1 seconds=3 frames), and one-fifth of a second worth of frames amounts to 6 frames (i.e., 30 frames/second×0.2 seconds=6 frames). The 30 fps framerate is provided by way of example only. Additional and alternative framerates may be selectively employed depending on the particular implementation of the video server, the video content, and the playback device.

The video fragment modification instruction module 428 may also determine the manner in which frames are added or removed from a video fragment 410. For example, when removing a frame from a video fragment 410, the video fragment modification instruction module 428 may remove the first frame of the video fragment, the last frame of the video fragment, or a frame between the first and last frame of the video fragment. Similarly, when adding a frame to a video fragment 410, the video fragment modification instruction module 428 may add the frame before or after the first frame of the video fragment, before or after the last frame of the video fragment, or before or after a frame between the first and last frame of the video fragment. The video fragment modification instruction module 428 may add a frame to a video fragment 410 by repeating a selected frame in the video fragment.

The playback device 400 may thus be configured to modify a video fragment 410 prior to playback of the video fragment or on-the-fly during playback of the video fragment. In some implementations, the video fragment modification instruction module 428 may add frames to or remove frames from a video fragment 410 stored in the video content buffer 406 prior to playback of that video fragment. Accordingly, upon playback, a modified video fragment may already include the additional frames added to the video fragment or may already lack the original frames removed from the video fragment. In other implementations, the playback device 400 may be configured to modify a video fragment 410 once playback of that video fragment has begun. For example, video fragment modification instruction module 428 may flag or otherwise identify the frames that should be added to or removed from a video fragment 410. The video codec 429 may in turn be configured to identify those frames that have been flagged for addition or removal. During playback, the video codec 429, in this example, may skip playback of any frames flagged for removal and repeat playback of any frames flagged for addition. In further implementations, a playback device may be configured to employ a combination of the techniques for modifying a video fragment prior to or during playback. Whether the playback device 400 modifies a video fragment 410 before playback or on-the-fly during playback may be a configurable parameter at the playback device 400. For example, in some implementations, the configuration information 418 may include a value indicating whether the video fragments 410 should be modified prior to or during playback. This value may also be locally or remotely configurable at a playback device using, e.g., one or more of the techniques described herein.

The video fragment modification instruction module 428 may also employ various techniques when adding multiple frames to or removing multiple frames from a video fragment 410. The particular techniques employed may depend on whether modification of the video content should go unnoticed by the viewers. It will be recognized with the benefit of the present disclosure that (i) viewers may be less likely to notice when relatively fewer frames are added or removed from the video fragments but that synchronization across multiple playback devices may take relatively longer to achieve, and (ii) synchronization across multiple playback devices may be achieved more quickly when relatively more frames are added or removed from the video fragments but that viewers may be more likely to notice the disruption in playback. Accordingly, with respect to the number of frames added to or removed from the video fragments, various implementations may be configured according to whether it is more desirable to achieve relatively faster synchronization or avoid noticeable disruptions in playback.

When adding n frames (n>1) to a video fragment 410, the video fragment modification instruction module 428 may repeat each of a sequence of adjacent frames of the video fragments and/or may repeat non-adjacent frames of the video fragment. The sequence of adjacent frames may be the first n frames of the video fragment, the final n frames of the video fragment, or a sequence of n frames between the first and final frame of the video fragment. The non-adjacent frames may be selected randomly or according to an interval (e.g., repeat every $n^{th}$ frame). In addition, where whole numbers of frames would result, each frame of y total non-adjacent subsequences of x number of frames may be repeated where y=n÷x.

Similar techniques may be selectively employed to remove six frames from the video fragment. When removing n frames (n>1) from a video fragment 410, the video fragment modification instruction module 428 may remove each of a sequence of adjacent frames of the video fragments and/or may remove non-adjacent frames of the video fragment. The sequence of adjacent frames may be the first n frames of the video fragment, the final n frames of the video fragment, or a sequence of n frames between the first and final frame of the video fragment. The non-adjacent frames may be selected randomly or according to an interval (e.g., repeat every $n^{th}$ frame). In addition, where whole numbers of frames would result, each frame of y total non-adjacent subsequences of x number of frames may be removed from the video fragment where y=n÷x.

For example, a video fragment 2.0 s in duration having a 30 fps framerate includes 60 total frames as noted above. Adding or removing one-fifth of a second (0.2 s) worth of frames to this example video fragment would add or remove six total frames to the video fragment (i.e., 30 frames/second×0.2 s=6 frames).

To add six frames to the video fragment, for example, one of the following techniques may be selectively employed. Each of the first six frames of the video fragment may be repeated, e.g., frame #1-#6. Each of the last six frames may be repeated, e.g., frame #55-#60. Each of a subsequence of frames may be repeated, e.g., frame #n-#n+5 where 1<n<55. Six frames of the video fragment may be selected at random and repeated. Every fifth frame of the video fragment may be repeated starting with the fifth frame, e.g., frame #5, frame #10, frame #15, frame #20, frame #25, and frame #30. Every fifth frame of the video fragment may be repeated starting with the first frame, e.g., frame #1, frame #6, frame #11, frame #16, frame #21, and frame #26. Each frame of three two-frame sequences may be repeated, e.g., frame #1-#2, frame #30-31, and frame #59-60. Each frame of two three-frame sequences may be repeated, e.g., frame #1-#3 and frame #58-#60.

To remove six frames from the video fragment, for example, one of the following techniques may be selectively employed. Each of the first six frames of the video fragment may be removed, e.g., frame #1-#6. Each of the last six frames may be removed, e.g., frame #55-#60. Each of a subsequence of frames may be removed, e.g., frame #n-#n+5 where 1<n<55. Six frames of the video fragment may be selected at random and removed. Every fifth frame of the video fragment may be removed starting with the fifth frame, e.g., frame #5, frame #10, frame #15, frame #20, frame #25, and frame #30. Every fifth frame of the video fragment may be removed starting with the first frame, e.g., frame #1, frame #6, frame #11, frame #16, frame #21, and frame #26. Each frame of three two-frame sequences may be removed, e.g., frame #1-#2, frame #30-31, and frame #59-60. Each frame of two three-frame sequences may be removed, e.g., frame #1-#3 and frame #58-#60.

Additional examples will be appreciated with the benefit of this disclosure. In addition, the various techniques described above may be employed when adding multiple frames to or removing multiple frames from video fragments having alternative durations and/or alternative framerates. In addition, the manner in which multiple video frames are added to or removed from a video fragment may be configurable parameters at the playback device 400. For example, in some implementations, the configuration information 418 may include one or more values indicating how multiple frames should be added to or removed from a video fragment. These values may also be locally or remotely configurable at a playback device using, e.g., one or more of the techniques described herein.

The number of frames added to or removed from a video fragment may also be a configurable parameter at the playback device 400. For example, in some implementations, the configuration information 418 may also include a value indicating the number of frames to add or remove when modifying a video segment. In some implementations, the number of frames added and the number of frames removed may be independent parameters and separately configurable at the playback device 400. The number of frames added or removed may also be locally or remotely configurable at a playback device using, e.g., one or more of the techniques described herein.

Additionally or alternatively, the playback device 400 may be configured to modify a video fragment by adjusting the display duration of the frames of the video fragment. For example, the playback device 400 may display the video content at 30 fps. In other words, the playback device 400 may display each frame of a video fragment for 1/30 of a second, the display duration. More generally, the display duration ($Display_{dur}$) may be described as one divided by the framerate (fps), i.e., $Display_{dur}=1\div fps$—the reciprocal of the framerate. To extend or shorten playback of a video fragment, the playback device 400 may add to or subtract from the framerate in the calculation of the display duration. The value added to or subtracted from the framerate may equal or otherwise correspond to the number of frames to adjust a video fragment by (e.g., 2 frames). An extended display duration ($Display_{dur+}$) may thus be calculated by subtracting a value equaling or corresponding to a number of frames to the framerate resulting in a larger reciprocal of the framerate, e.g., $Display_{dur+}=1\div(fps-frames)$. A shortened display duration ($Display_{dur+}$) may similarly be calculated by adding a value equaling or corresponding to a number of frames to the framerate resulting in a smaller reciprocal of the framerate, e.g., $Display_{dur-}=1\div(fps+frames)$. With references to the example above where the framerate is 30 fps and the $Display_{dur}=1/30$ seconds, an extended display duration may be 1/28 seconds where the number of frames to subtract is 2 (e.g., $Display_{dur+}=1\div(30-2)=1/28$), and a shortened display duration may be 1/32 seconds where the number of frames to add is 2 (e.g., $Display_{dur-}=1\div(30+2)=1/32$). Additional examples will be appreciated with the benefit of this disclosure. The video content playback instructions 412 may thus include instructions and/or an instruction module to calculate an extended display duration and a shortened display duration and utilize the extended or shorted display duration during playback of a video fragment 410.

In addition to modifying the video fragments, the playback device 400 may also be configured to modify the audio associated with the video fragments to synchronize the audio of video content across multiple playback devices. The playback device 400 may modify the audio associated with the video content using similar techniques, e.g., adding, removing, extending, or shortening the audio samples of the audio content. Digital audio content, for example, may be segmented into audio samples. In some instances, a two-second fragment of digital audio content may include up to 100,000 audio samples. As with the video frames of a video fragment, one or more of those audio samples may be added to, removed from, extended, or shortened until synchronization is achieved. An audio fragment may include relatively more audio samples than a video fragment includes video frames. As a result, the playback device 400 may need to add, remove, extend, or shorten relatively more audio samples of the audio fragments to achieve synchronization. Techniques similar to those described above may be selectively employed when adding, removing, extending, or shortening audio samples of audio fragments. For example, one or more audio samples may be removed from an audio fragment. The audio samples removed from an audio fragment may be a range of consecutive audio samples, e.g., sample #n-#m, where n is the first audio sample of the range and m is the last audio sample of the range. The audio samples removed from an audio fragment may also be individual audio samples. For example, every $x^{th}$ audio sample may be removed from an audio fragment, e.g., sample #100, sample #200, sample #300, etc., where x=100. The audio samples added to an audio fragment may likewise be a range of consecutive audio samples or individual audio samples. The individual audio samples added to an audio fragment may also be distributed throughout the audio fragment, e.g., by repeating every $x^{th}$ audio sample. The audio samples added to or removed from an audio fragment may also be selected at random. Additional and alternative examples for adding, removing, extending, or shortening the audio samples of an audio fragment will be appreciated with the benefit of this disclosure. The video content playback instructions 412 may thus include instructions and/or an instruction module to modify an audio fragment during playback of the audio content associated with the video content received at the playback device.

Figure 5:
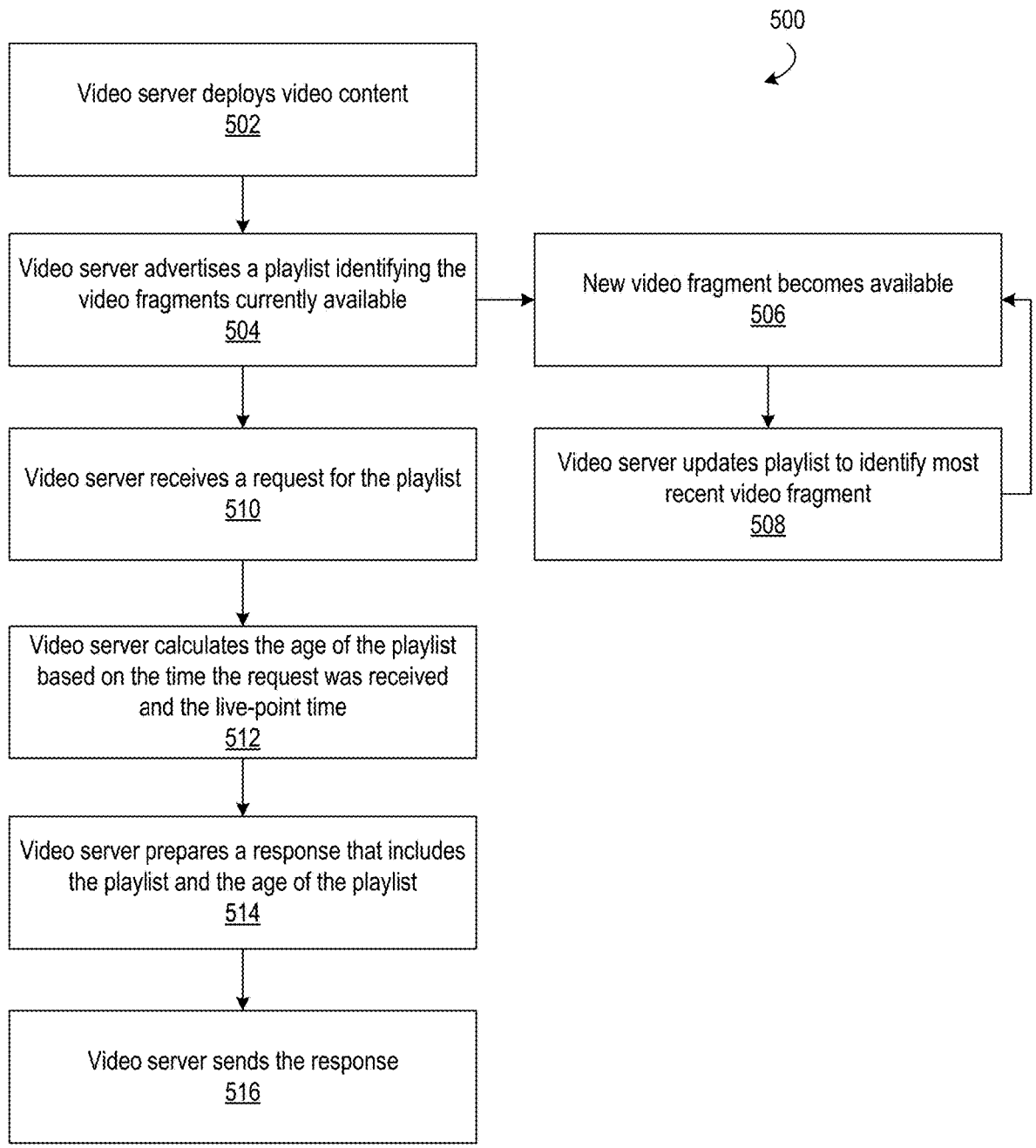
FIG. 5 depicts a flowchart of example method steps in accordance with aspects described herein.

In FIG. 5, a flowchart 500 of example method steps for serving a segmented video stream from a video server is shown. A video server may perform the steps shown by way of example in FIG. 5 when, e.g., providing a live (i.e., real-time or near real-time) segmented video stream or time-shifted video stream. A video server may deploy, provide, or otherwise make available video content (502) and advertise a playlist identifying the video fragments currently available for that video content (504). As new video fragments become available at the video server (506), the video server may update the playlist for the video content to identify the most recently available video fragment (508). The video server may update the playlist for the video content at regular or irregular intervals as new video fragments become available. As described above, the playlist may identify the last n number video of fragments available. As also noted above, the live-point time of the video server may be the time at which the playlist was updated when the most recent video fragment became available.

The video server may receive a request for the playlist (510), e.g., from a playback device. In response, the video server may calculate the age of the playlist based on the time the video server received the request and the live-point time (512). Having calculated the age of the playlist, the video server may prepare a response that includes as its payload the playlist for the video content as well as the age of the playlist (514) and send the response (516), e.g., to the playback device.

Although not shown in FIG. 5, a video server may also receive (e.g., from a playback device) a request for the video fragments currently available from the video server. In response, the video server may prepare a response that includes as its payload one or more of the video fragments available. Throughout the segmented video stream, a playback device may request the playlist for the video content and the video fragments currently available from the video server at regular or irregular intervals. During the segmented video stream, the playback device may request the playlist and/or the video fragments from the video server concurrent with playback of video fragments previously requested and received from the video server.

Figure 6:
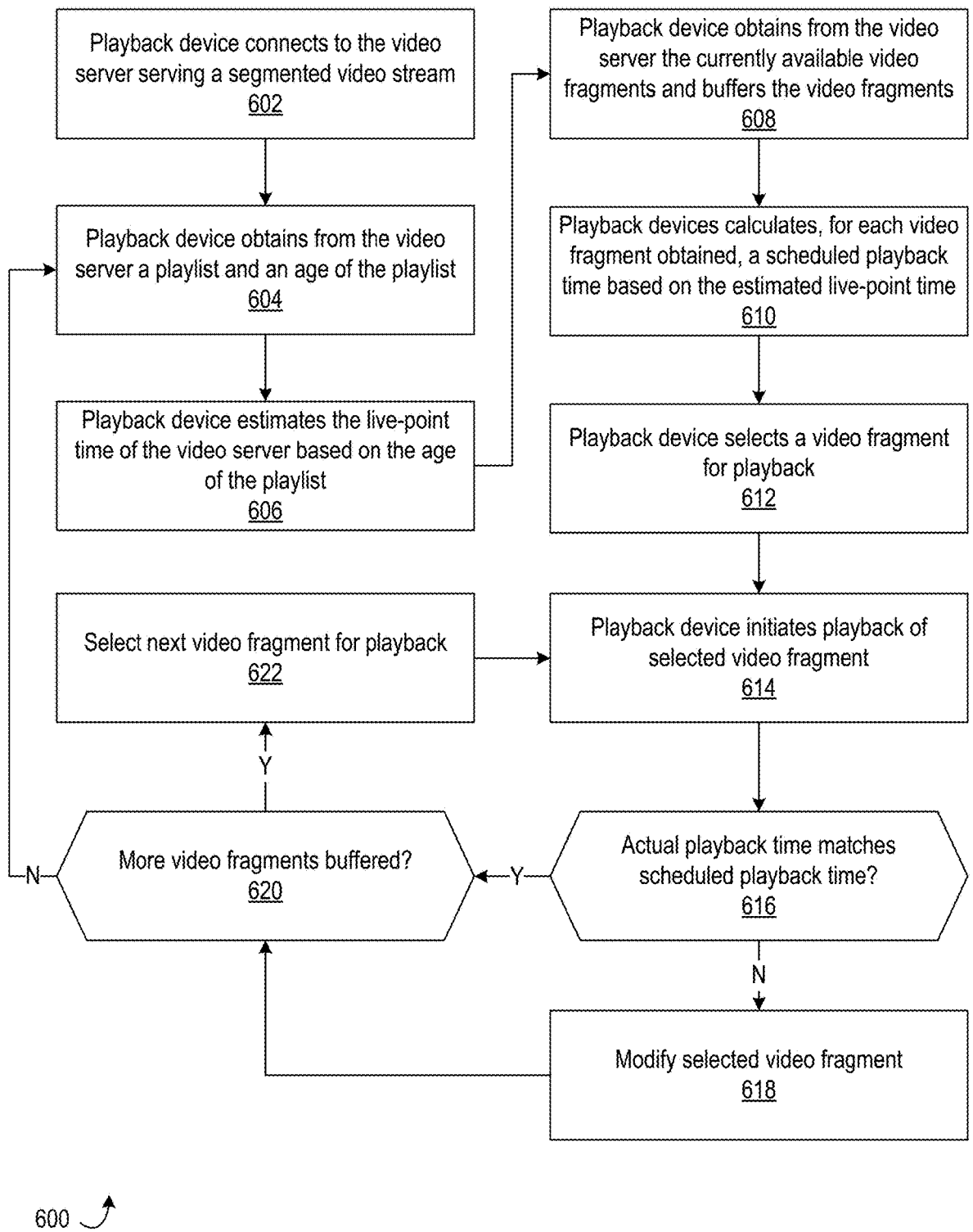
FIG. 6 depicts a flowchart of example method steps in accordance with aspects described herein.

Referring now to FIG. 6, a flowchart 600 of example method steps for performing playback of a segmented video stream at a playback device is shown. A playback device may connect to a video server serving a segmented video stream (602). The playback device may obtain, from the video server, a playlist for the video content of the segmented video stream and an age of the playlist (604). As described above, the playback device may transmit, to the video server, a request for the playlist and receive, from the video server, a response that includes as its payload the playlist and the age of the playlist.

Having received the age of the playlist, the playback device may estimate the live-point time of the video server based on the age of the playlist (606). As described above, the playback device estimates the live-point time of the video server in terms of the clock time of the playback device. The playback device may then obtain, from the video server, the video fragments currently available and buffer the video fragments obtained (608). As described above, the playback device may transmit, to the video server, a request identifying the video fragments listed in the playlist received from the video server. The playback device may then receive, from the video server, a response that includes as its payload the video fragments requested.

Having obtained video fragments from the video server, the playback device may calculate, for each video fragment obtained, a scheduled playback time that is based on the estimated live-point time (610). As described above, calculating the scheduled playback time for a video fragment may include applying an offset. The playback device then selects a video fragment for playback (612) and initiates playback of the selected video fragment (614). The playback device also determines whether the actual playback time of the selected video fragment matches the scheduled playback time (616). To be considered a match, the actual playback time need not exactly equal the scheduled playback time. In some implementations, for example, the playback device may be configured to determine that the actual playback time matches the scheduled playback time when the difference between the scheduled playback time and the actual playback time is less than a predetermined threshold (e.g., a difference less than or equal to 10 ms).

If the actual playback time does not match the scheduled playback time (616:N), then the playback device may modify the scheduled video fragment (618). As described above, the playback device may modify the video fragment by adding or removing one or more frames from the video fragment. Having executed playback of a selected video fragment, the playback device may determine whether additional video fragments are buffered (620). If so (620:Y), the playback device may select the next video fragment for playback (622) and repeats the steps of initiating playback, determining whether the actual playback time of the next video fragment matches its scheduled playback time, and, if necessary, modifying the next video fragment. If no buffered video fragments remain (620:N), then the playback device may obtain an updated playlist from the video server and repeat the steps of estimating the live-point time of the video server based on the age of the updated playlist, obtaining the newly available video fragments identified in the updated playlist, calculating scheduled playback times for the newly available video fragments, and initiating playback of the newly available video fragments with modifications to those video fragments if necessary to align the actual playback times with the respective scheduled playback times.

The steps depicted in FIG. 6 are provided by way of example only. Various implementations may perform additional or alternative steps for playback of a segmented video stream in accordance with aspects described herein. In addition, one or more of the steps depicted in FIG. 6 may, in example implementations, be performed concurrently with playback of video fragments obtained from the video server. For example, a playback device need not wait until the video buffer contains no more video fragments before requesting an updated playlist and/or requesting additional video fragments from the video server. The playback device may, in example implementations, request an updated playlist and additional video fragments concurrent with playback of video fragments that have already been received and buffered. As noted above, the playback device may request the updated playlists and additional video fragments at regular or irregular intervals.

Figure 7:
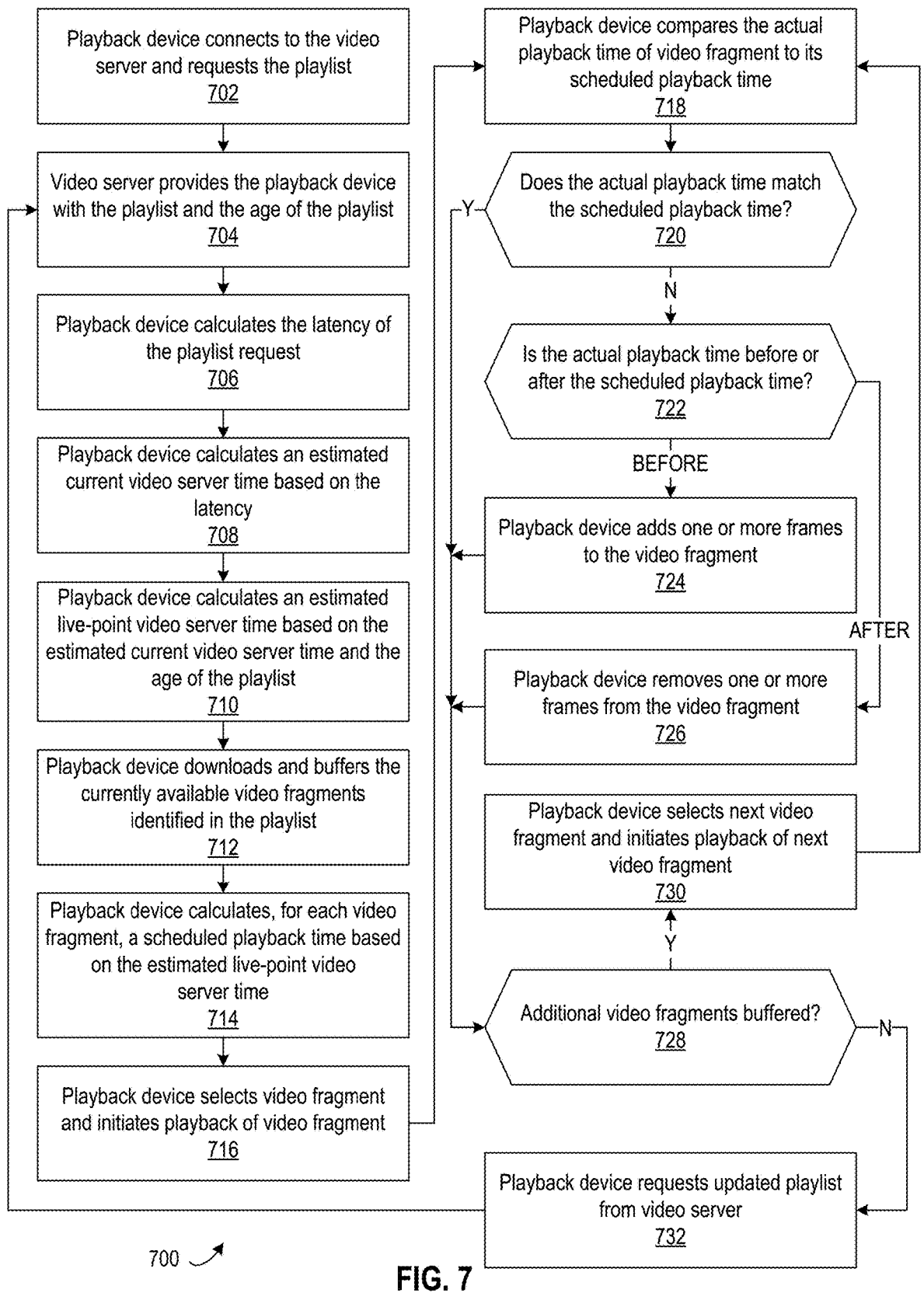
FIG. 7 depicts a flowchart of example method steps in accordance with aspects described herein.

FIG. 7 depicts a flowchart 700 of example method steps for synchronizing a segmented video stream at across multiple playback devices. When multiple playback devices perform the steps shown by way of example in FIG. 7, those playback devices may synchronize playback of a segmented video stream available from a video server.

A playback device may connect to a video server and request the playlist of a segmented video stream provided by that video server (702). In response to the request, the video server provides to the playback device the requested playlist along with an age of the playlist (704). As described above, the video server may calculate the age of the playlist based on the time it received the playlist request and the time it last updated the playlist, e.g., when a new video fragment became available. Upon receipt of the playlist, the playback device may calculate the latency of the playlist request (706). As described above, the latency may be the duration between sending the playlist request from the playback device and receiving the playlist request at the playback device. As also noted above, the playback device may assume the upstream and downstream time are the same. Accordingly, the playback device may estimate the downstream time—the time between sending the response from the video server and receiving the response at the playback device—as half the round trip time.

The playback device may then calculate an estimated current time of the video server based on the latency (708), in particular, the portion of the latency attributable to the downstream response from the video server. As described above, the playback device, in this example, estimates the current time of the video server in terms of the clock time of the playback device. The playback device may then calculate an estimated live-point time of the video server based on the estimated current time of the video server and the age of the playlist (710). As noted above, the live-point time of the video server, in this example, refers to the last time the video server updated the playlist of the segmented video stream, e.g., when a new video fragment becomes available. As also noted above, the playback device, in this example, estimates the live-point time of the video server in terms of the clock of the playback device.

The playback device may then download and buffer the one or more of the currently available video fragments identified in the playlist (712). For each video fragment, the playback device calculates a scheduled playback time based on the estimated live-point time of the video server (714). As noted above the playback device may apply an offset when calculating the scheduled playback times. As also noted above, the playback device may, in some example implementations, calculate an actual playback time for each video fragment. Having calculated the scheduled playback times for the video fragments, the playback device selects and initiates playback of a video fragment (716).

The playback device may compare the actual playback time of the selected video fragment to its scheduled playback time (718) and determine whether the actual playback time matches the scheduled playback time (720). If not (720:N), then the playback device may determine whether the actual playback time of the selected video fragment is before or after its scheduled playback time (722). If before (722:BEFORE), then the playback device may add one or more video frames to the selected video fragment (724). If after (722:AFTER), then the playback device may remove one or more frames from the selected video fragment (726).

Having performed playback of the selected video fragment either on time (720:Y), early (722:BEFORE), or late (722:AFTER), the playback device may determine whether additional video fragments remain in the video buffer for playback (728). If so (728:Y), then the playback device selects and initiates playback of the next video fragment (730). The playback device may then repeat the steps of determining whether the actual playback time of the next video fragment matches its scheduled playback time and, if necessary, modifying the next video fragment by adding or removing one or more frames. If no video fragments remain in the video buffer for playback (728:N), then the playback device may request an updated playlist from the video server (732).

As noted above, the updated playlist may identify one or more video fragments newly available from the video server. In response to the request for the updated playlist, the playback device may receive the updated playlist from the video server along with an age of the updated playlist. The playback device may then, in some example implementations, repeat the steps of estimating the live-point time of the video server, calculating scheduled playback times for the new video fragments, and modifying the video fragments as needed to align their actual playback times with their scheduled playback times. As noted above, the playback device need not wait until the video buffer is depleted before requesting an updated playlist. In example implementations, the playback device may request and receive updated playlists as well as newly available video fragments while previously received video fragments are still buffered.

Figure 8A:
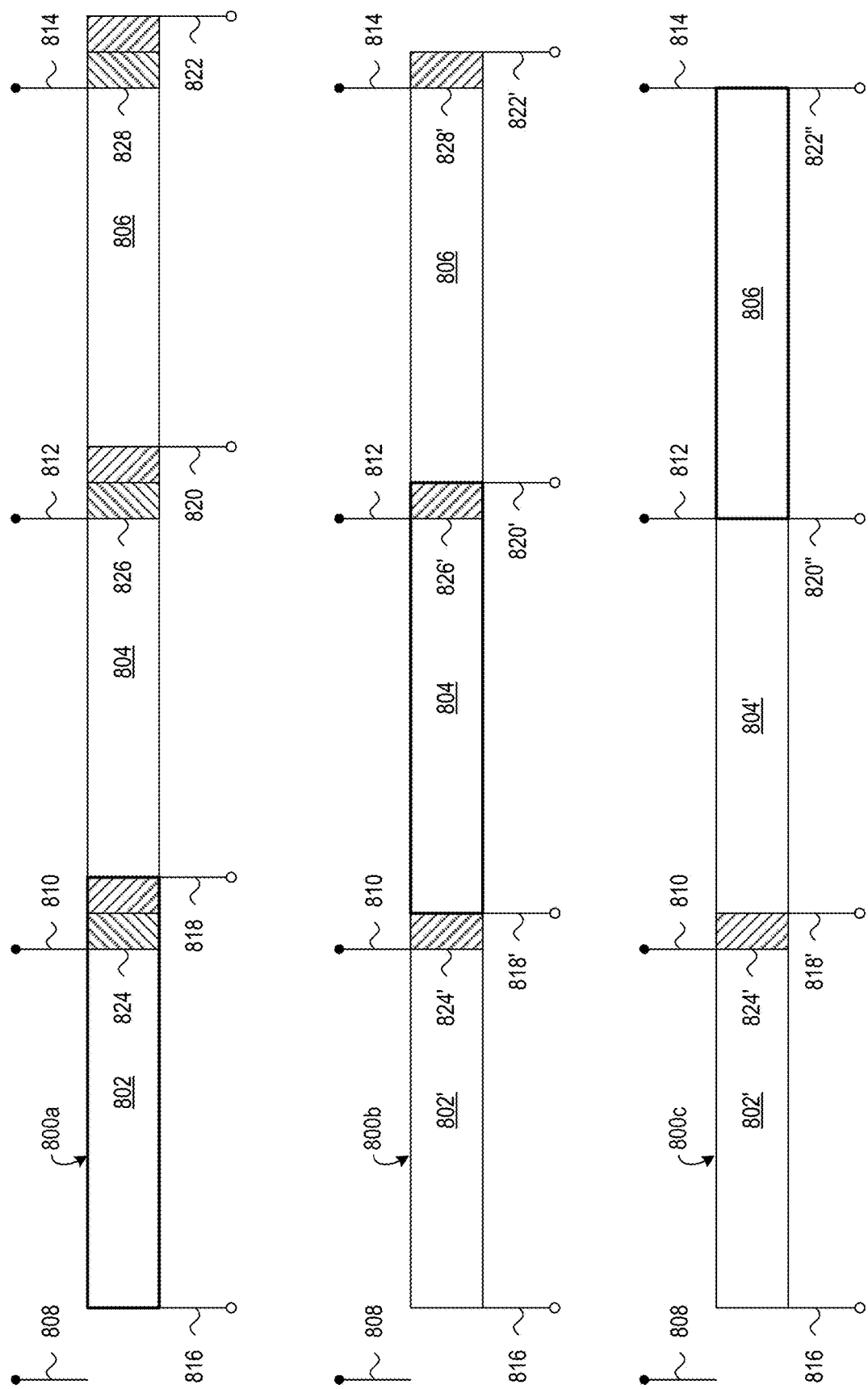
FIG. 8A depicts an example timeline of a synchronized segmented video stream in accordance with aspects described herein.
Figure 8B:
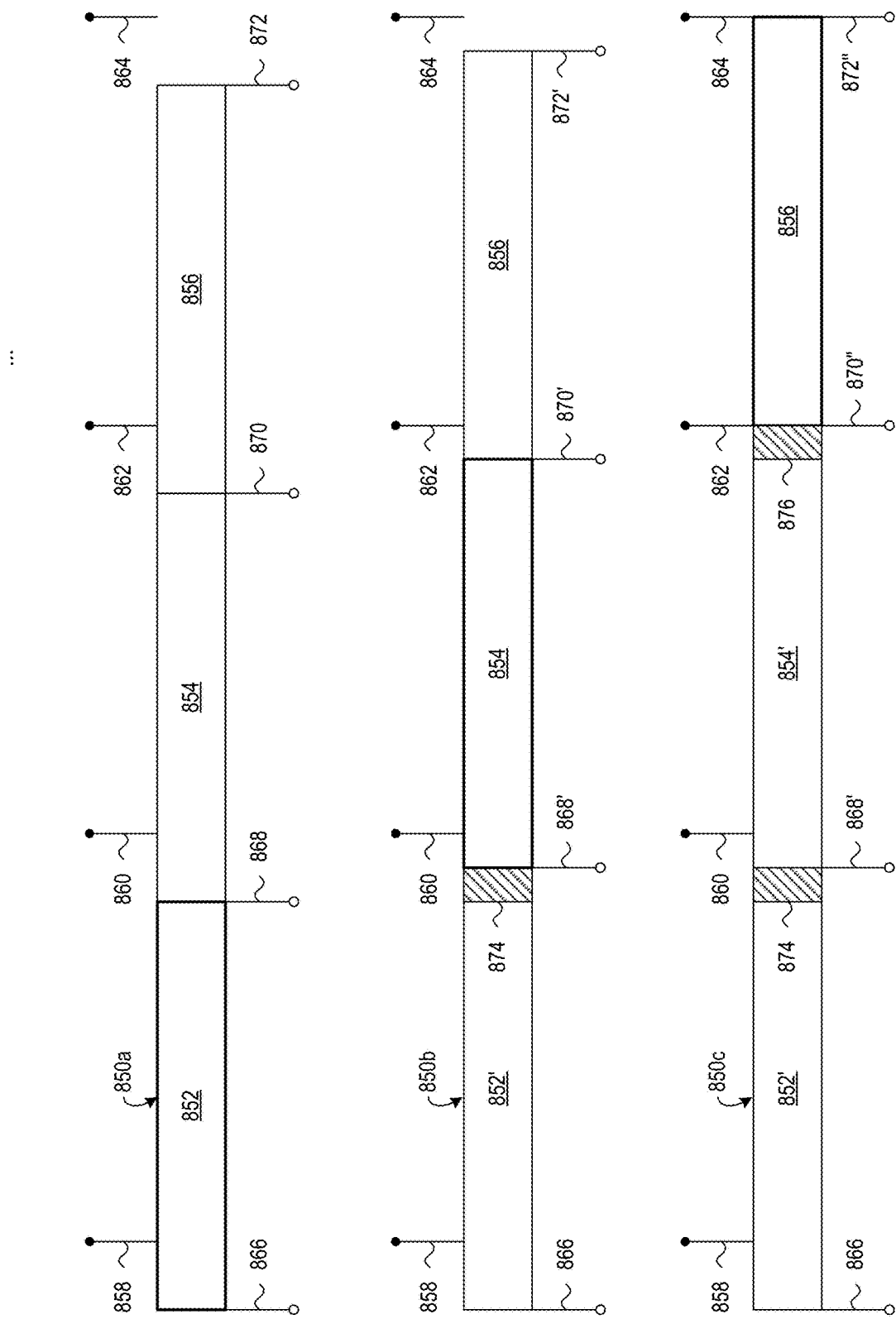
FIG. 8B depicts another example timeline of a synchronized segmented video stream in accordance with aspects described herein.

Referring now to FIGS. 8A-B, example timelines of synchronized segmented video streams are shown. As seen in FIGS. 8A-B, the video streams are depicted without reference to the duration or the framerate of the video fragments. This is because the techniques described herein may synchronize playback of a segmented video stream across multiple playback devices regardless of fragment duration or framerate. Various implementations may be configured such that the number of frames added to or removed from the video fragments take into account the limits of human perception with respect to the particular framerates of the video content employed in those implementations.

FIG. 8A depicts three timelines 800a, 800b, and 800c to illustrate how the actual playback times of the video fragments eventually align with the scheduled playback times of the video fragments. In FIG. 8A, the actual playback times of the video fragments occur after their scheduled playback times, i.e., playback of the video fragments is late. Accordingly, as shown in FIG. 8A, video frames are removed from the video fragments until the actual playback times of the video fragments align with their scheduled playback times.

Three example video fragments 802, 804, and 806 are shown in FIG. 8A. The markers 808-814 above of the timelines 800a-c correspond to the scheduled start times for each respective video fragment 802-806 in units of the clock time at the playback device. Marker 808 corresponds to the scheduled playback time for video fragment 802; marker 810 corresponds to the scheduled playback time for video fragment 804; marker 812 corresponds to the scheduled playback time for video fragment 806; and marker 814 corresponds to the scheduled playback time for the video fragment that follows video fragment 806 which has been omitted from FIG. 8A for the sake of clarity.

The markers 816-822 beneath the timelines 800a-c correspond to the actual playback times for each respective video fragment 802-806 in units of the clock time at the playback device. Marker 816 corresponds to the actual playback time for video fragment 802; marker 818 corresponds to the actual playback time for video fragment 804; marker 820 corresponds to the actual playback time for video fragment 806; and marker 822 corresponds to the actual playback time for video fragment that follows video fragment 806 which has been omitted from FIG. 8A for the sake of clarity.

As seen in FIG. 8A, the scheduled playback times do not change. The actual playback times, however, incrementally approach respective scheduled playback times as the video fragments are modified by removing video frames. In addition, removing frames from a video fragment shortens the duration of the video fragment. To illustrate the alignment of the actual playback times with respective scheduled playback times and the video fragments having shortened durations, tick marks (') are employed in FIG. 8A to annotate those actual playback times and video fragments that change due to the removal of frames from the video fragments.

Referring to timeline 800a, the actual playback time of each video fragment 802-806 occurs after their respective scheduled playback times. In particular, the actual playback time 816 of video fragment 802 occurs after its scheduled playback time 808. As a result the actual playback times 818 and 820 for video fragments 804 and 806 also occur after their respective scheduled playback times 810 and 812. As seen in FIG. 8A, playback of a portion 824 of video fragment 802 extends past the scheduled playback time 810. In turn, playback of a portion 826 of video fragment 804 extends past the scheduled playback time 812, and playback of a portion 828 of video fragment 806 extends past the scheduled playback time 814. One or more frames of video fragment 802 may thus be removed which moves up the actual playback times 818-822 of the subsequent video fragments. As described above, the number of frames removed may be limited to a number of frames that would go unnoticed by the viewer during playback of video fragment 802.

In timeline 800b, one or more frames have been removed from video fragment 802', e.g., either before or during playback. Although playback of a portion 824' of the video fragment 802' still extends past the scheduled playback time 810, the duration of the portion 824' is shorter than the duration of the portion 824. In turn, the durations of the video fragment portion 826' that extends past the scheduled playback time 812 and the video fragment portion 828' that extends past the scheduled playback time 814 are also shorter in duration relative to video fragment portions 826 and 828 respectively. As a result, the actual playback times 818', 820', and 822' are closer to the scheduled playback times 810,812, and 814 respectively.

In timeline 800c, one or more frames have been removed from video fragment 804', e.g., either before or during playback. By removing frames from video fragment 804', the actual playback time 820' for video fragment 806 has aligned with the scheduled playback time 812, and the actual playback time 822" for the next video fragment has aligned with the scheduled playback time 814. Because the actual playback times have aligned with the scheduled playback times when playback of the video fragment 806 is initiated, there is no need to remove any frames from the video fragment 806.

Turning now to FIG. 8B, three timelines 850a, 850b, and 850c are also shown to illustrate how the actual playback times of the video fragments eventually align with the scheduled playback times of the video fragments. In FIG. 8B, the actual playback times of the video fragments occur before their scheduled playback times, i.e., playback of the video fragments is early. Accordingly, as shown in FIG. 8B, video frames are added to the video fragments until the actual playback times of the video fragments align with their scheduled playback times.

Three example video fragments 852, 854, and 856 are shown in FIG. 8A. The markers 858-864 above of the timelines 850a-c correspond to the scheduled start times for each respective video fragment 852-856. Marker 858 corresponds to the scheduled playback time for video fragment 852; marker 860 corresponds to the scheduled playback time for video fragment 854; marker 862 corresponds to the scheduled playback time for video fragment 856; and marker 864 corresponds to the scheduled playback time for the video fragment that follows video fragment 856 which has been omitted from FIG. 8B for the sake of clarity.

The markers 866-872 beneath the timelines 800a-c correspond to the actual playback times for each respective video fragment 802-806. Marker 816 corresponds to the actual playback time for video fragment 802; marker 818 corresponds to the actual playback time for video fragment 804; marker 820 corresponds to the actual playback time for video fragment 806; and marker 822 corresponds to the actual playback time for video fragment that follows video fragment 806 which has been omitted from FIG. 8A for the sake of clarity.

As again seen in FIG. 8B, the scheduled playback times do not change. The actual playback times, however, incrementally approach respective scheduled playback times as the video fragments are modified by adding video frames. In addition, adding frames to a video fragment extends the duration of the video fragment. To illustrate the alignment of the actual playback times with respective scheduled playback times and the video fragments having extended durations, tick marks (') are employed in FIG. 8B to annotate those actual playback times and video fragments that change due to the addition of frames to the video fragments.

Referring to timeline 852a, the actual playback time of each video fragment 852-856 occurs before their respective scheduled playback times. In particular, the actual playback time 866 of video fragment 852 occurs before its scheduled playback time 858. As a result the actual playback times 868 and 870 for video fragments 854 and 856 also occur after their respective scheduled playback times 860 and 862. One or more frames may thus be added to video fragment 852 which moves down the actual playback times 868-872 of the subsequent video fragments. As described above, the number of frames added may be limited to a number of frames that would go unnoticed by the viewer during playback of video fragment 852. As also noted above, frames may be added to the video fragment 852 by repeating one or more frames of the video fragment.

In timeline 850b, one or more frames 874 have been added to video fragment 852', e.g., either before or during playback. Although playback the video fragment 854 still occurs before the scheduled playback time 860, the actual playback time 868' is moved closer to the scheduled playback time 860 by adding frames to the preceding video fragment 852'. In turn, the actual playback times 870' and 872' have also been moved closer to the scheduled playback times 862 and 864 respectively.

In timeline 800c, one or more frames 876 have been added to video fragment 854', e.g., either before or during playback. By adding frames 876 to video fragment 854', the actual playback time 870" for video fragment 856 has aligned with the scheduled playback time 862, and the actual playback time 872" for the next video fragment has aligned with the scheduled playback time 864. Because the actual playback times have aligned with the scheduled playback times when playback of the video fragment 856 is initiated, there is no need to add any frames to the video fragment 856.

As described above, when the techniques described herein are carried out by multiple playback devices, playback of a segmented video stream by those playback devices may be synchronized. It will also be appreciated with the benefit of the disclosure that multiple playback devices may synchronize playback of a segmented video stream when playback of the video fragments at one playback device is early but playback of the video fragments at another playback device is late. Each playback device, in this example, would add or remove frames as needed to align the actual playback times of the video fragments with the scheduled playback times respectively calculated independently at each playback device. Multiple playback devices may thus synchronize playback of a segmented video stream without coordinating amongst each other and without need of additional infrastructure (e.g., a master control device) that coordinates playback across the playback devices. Rather synchronization is achieved across playback devices through independent operations carried out at each playback device. As a result, synchronization may be achieved without any additional equipment or devices beyond the video server that provides the age of the playlist for the segmented video content and the playback devices themselves that estimate the live-point time of the video server, calculate scheduled playback times, and modify the video fragments as needed to align the actual playback times with the scheduled playback times.

Figure 9:
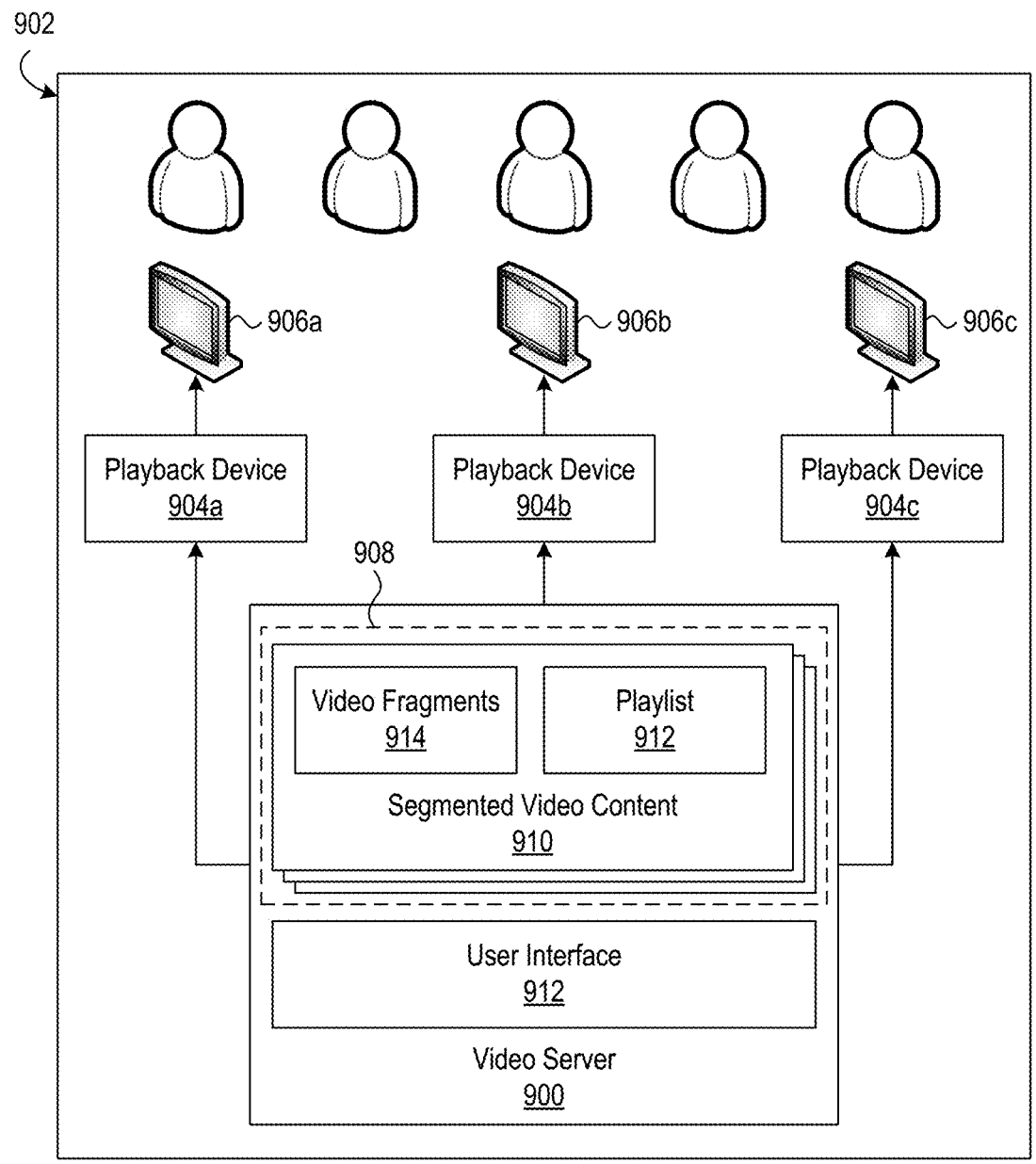
FIG. 9 depicts another example configuration of a system for synchronizing segmented video streams across multiple playback devices in accordance with aspects described herein.

In FIG. 9, another example configuration of a system for synchronizing segmented video streams across multiple playback devices is shown. The system described with reference to FIG. 9 may incorporate on-demand features. As seen in FIG. 9, a video server 900 is deployed to a site 902 at which multiple playback devices 904a, 904b, and 904c are also deployed. Each playback device 904a-c is respectively connected to a co-located display device. Playback device 904a is connected to display device 906a, playback device 904b is connected to display device 906b, and playback device 904c is connected to display device 906c. The arrangement of playback devices 904a-c and display devices 906a-c at the site 902 may thus resemble an arrangement of playback devices and display devices found, e.g., in a sports bar.

The video server 900 may include a set 908 of segmented video content items 910. The video server, in this example, may be configured for on-demand playback or user-scheduled playback of the video content items 910. For example, a user may select one or more of the segmented video content items 910 and initiate a segmented video stream. Once initiated, the playback devices 904a-c may request the playlist 912 and the video fragments 914 for the segmented video stream as described above. Some example scenarios of on-demand or scheduled playback include selecting sports highlights for playback on multiple display screens at a sports bar, selecting music videos for playback on multiple display screens at a nightclub, selecting advertisements for playback on multiple digital billboards, and additional examples which will be appreciated with the benefit of this disclosure.

A user may access the set 908 of segmented video content items 910 via a user interface 916. The user interface 916 may be configured to provide output indicating which segmented video content items 910 are available at the video server along with information describing the segmented video content items available, e.g., name, title, description, duration, category, etc. The user interface 916 may be configured to receive input from the user selecting one or more of the segmented video content items for playback at the playback devices 904a-c. The user interface 916 may be configured to receive input from the user that controls the sequence of multiple segmented video content items 910 selected for playback, e.g., in user-selected order, at random, etc. The user interface 916 may be configured to receive input from the user that controls when the video server initiates the segmented video stream, e.g., immediately, at a user-selected time, etc.

Figure 10:
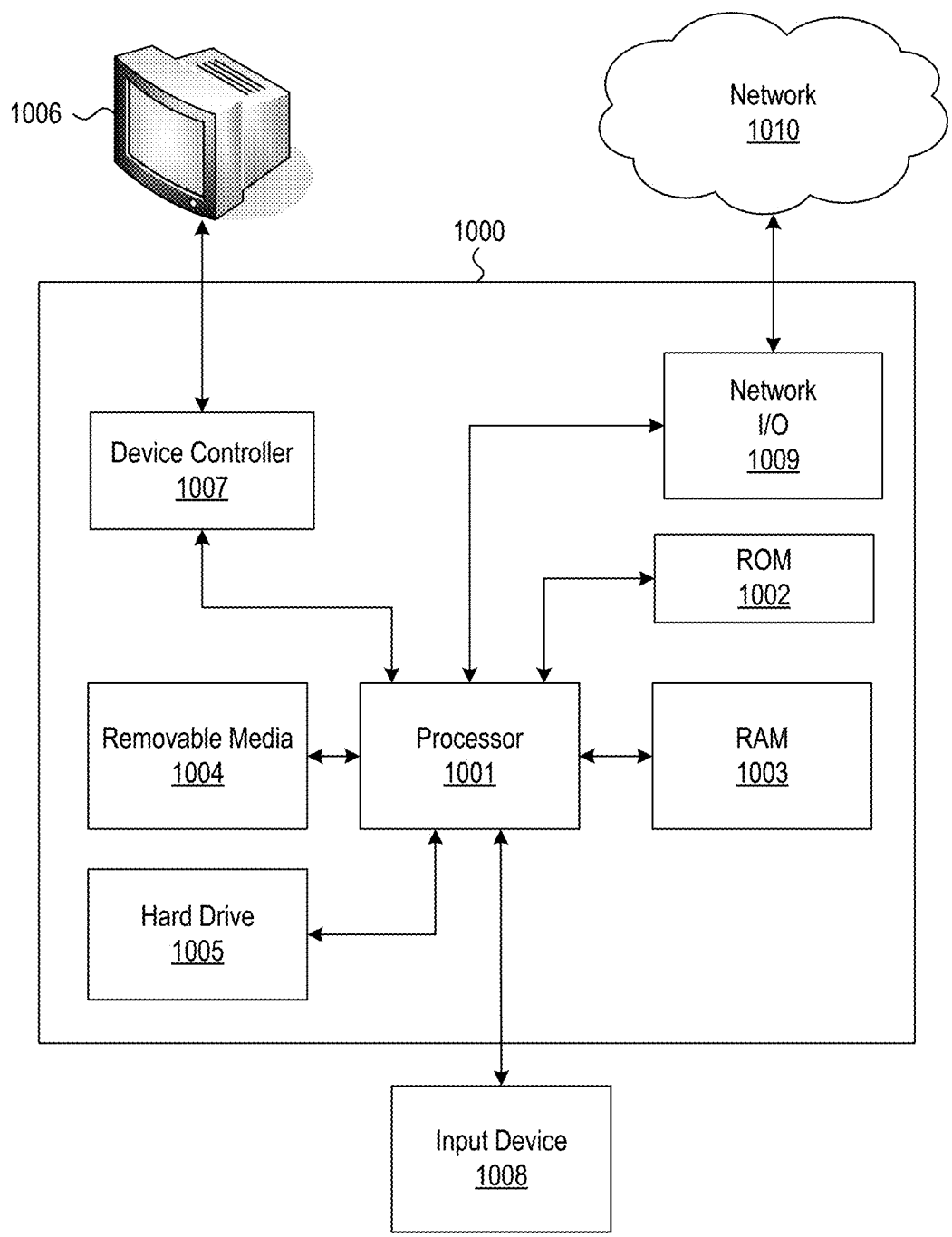
FIG. 10 depicts an example of an implementation of a computing platform on which various aspects described herein can be implemented.

Referring now to FIG. 10, an example of an implementation of a computing platform on which various aspects described herein can be implemented is shown. FIG. 10 illustrates general hardware elements that can be used to implement any of the various computing devices discussed herein. The computing device 1000 may include one or more processors 1001, which may execute instructions of a computer program to perform any of the features described herein. The instructions may be stored in any type of computer-readable medium or memory, to configure the operation of the processor 1001. For example, instructions may be stored in a read-only memory (ROM) 1002, random access memory (RAM) 1003, removable media 1004, such as a Universal Serial Bus (USB) drive, compact disk (CD) or digital versatile disk (DVD), floppy disk drive, or any other desired storage medium. Instructions may also be stored in an attached (or internal) hard drive 1005. The computing device 1000 may include one or more output devices, such as a display 1006 (e.g., an external television), and may include one or more output device controllers 1007, such as a video processor. There may also be one or more user input devices 1008, such as a remote control, keyboard, mouse, touch screen, microphone, etc. The computing device 1000 may also include one or more network interfaces, such as a network input/output (I/O) circuit 1009 (e.g., a network card) to communicate with an external network 1010. The network I/O circuit 1009 may be a wired interface, wireless interface, or a combination of the two. In some examples, the network input/output circuit 1009 may include a modem (e.g., a cable modem), and the external network 1010 may include communication links such as communication links 101 discussed above, the external network 109 discussed above, an in-home network, a provider's wireless, coaxial, fiber, or hybrid fiber/coaxial distribution system (e.g., a DOCSIS network), or any other desired network. Additionally, the computing device 1000 may include a location-detecting device, such as a global positioning system (GPS) microprocessor 1011, which can be configured to receive and process global positioning signals and determine, with possible assistance from an external server and antenna, a geographic position of the device.

The FIG. 10 example is a hardware configuration, although the illustrated components may be implemented as software as well. Modifications may be made to add, remove, combine, divide, etc. components of the computing device 1000 as desired. Additionally, the components illustrated may be implemented using basic computing devices and components, and the same components (e.g., processor 1001, ROM storage 1002, display 1006, etc.) may be used to implement any of the other computing devices and components described herein. For example, the various components herein may be implemented using computing devices having components such as a processor executing computer-executable instructions stored on a computer-readable medium, as illustrated in FIG. 10. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more non-transitory computer readable media such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

In addition, implementations may be selectively configured with respect to how the segmented video content is encoded and delivered to a playback device. Configurations may selectively employ different communication protocols, video formats (e.g., resolution and aspect ratio), framerates, video fragment durations, and video codecs. Some examples of adaptive media streaming communications protocols that may be employed to stream segmented video content from a video server to a playback device include, e.g., Dynamic Adaptive Streaming over HTTP (MPEG-DASH), HTTP Live Streaming (HLS). Some examples of network communication protocols that may be employed to deliver video fragments from a video server to a playback device include TCP/IP, HTTP/1.1, HTTP/2.0, and QUIC (Quick UDP Internet Connections). Example aspect ratios for the segmented video content include 16:9 and 4:3. Example resolutions at a 16:9 aspect ratio include, e.g., 416×234, 480×270, 640×360, 960×540, 1280×720, and 1920×1080. Example resolutions at a 4:3 aspect ratio include, e.g., 400×300, 480×360, 640×480, 960×720, 1280×960, and 1920×1440. Example framerates include, e.g., 12 fps, 15 fps, 24 fps (23.98 fps), 25 fps, 30 fps (29.97 fps), 50 fps, and 60 fps (59.94 fps). The segmented video content may be formatted according to other example video formats including: low-definition television (LDTV) video formats, e.g., 96p, 120p, 144p, 240p, 288p, and 360p; standard-definition television (SDTV) video formats, e.g., 576i 4:3, 576i 16:9, 480i 4:3, and 480i 16:9; enhanced-definition television (EDTV) video formats, e.g., 480p, 576p, 480i, and 576i; high-definition television (HDTV) video formats, e.g., 720p, 1080p, and 1080i; and ultra-high definition television (UHDTV) video formats, e.g., 2160p and 4320p. Some examples of video codecs that may be employed for the segmented video content include H.264/MPEG-4 AVC (Moving Picture Experts Group, Advanced Video Coding) and H.265/MPEG-H Part 2/HEVC (High Efficiency Video Coding). In some example implementations, the video content may be compressed using vector-based compression techniques in which a video frame is presented using contoured colors rather than an arrangement of pixels.

Furthermore, the techniques described herein are not limited to synchronizing playback segmented video content across multiple playback devices. Rather, the synchronization techniques described may be employed to synchronize playback of other types of events. Example include synchronization of (i) sports scores provided by a remote server configured to provide a stream of sports scores to multiple client devices, (ii) stock quotes provided by a remote server configured to provide a stream of stock quotes to multiple client devices, (iii) video game events provided by a remote server configured to execute a video game (e.g., a multi-player video game) and provide a stream of video game events to multiple video game machines, (iv) segmented audio content such as telephone conferences, digital radio broadcasts, internet podcasts, and other types of segmented audio content, (v) physical simulations such as radioactive decay models, fluid dynamics models, and other types of physical simulations, (vi) discrete event simulations such as automobiles in a grid system, trains in a rail system, and other types of discrete event simulations.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings.

For example, the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:
1. A system comprising:
 a first computing device comprising:
  one or more processors; and
  memory storing first instructions that, when executed by the one or more processors of the first computing device, cause the first computing device to:
   provide video content comprising at least a first fragment and a second fragment, wherein the first fragment and the second fragment each comprises a plurality of video frames; and a second computing device comprising:
one or more processors; and
memory storing second instructions that, when executed by the one or more processors of the second computing device, cause the second computing device to:
receive, from the first computing device, the first fragment and the second fragment;
receive, from the first computing device, a value indicating an age of a playlist that indicates at least one of the first fragment or the second fragment is available from the first computing device;
select a scheduled playback time for the first fragment based on the age of the playlist;
determine that an actual playback time of the first fragment is different from the scheduled playback time; and
modify, based on a difference between the scheduled playback time and the actual playback time, the second fragment.

2. The system of claim 1, wherein the second instructions, when executed by the one or more processors of the second computing device, cause the second computing device to modify the second fragment either by adding one or more video frames to the second fragment or by removing one or more video frames from the second fragment.

3. The system of claim 2, wherein the second instructions, when executed by the one or more processors of the second computing device, cause the second computing device to add the one or more video frames to the second fragment based on determining that the actual playback time is before the scheduled playback time or remove the one or more video frames from the second fragment based on determining that the actual playback time is after the scheduled playback time.

4. The system of claim 2, wherein the second instructions, when executed by the one or more processors of the second computing device, cause the second computing device to add the one or more video frames to the second fragment by repeating playback of at least one video frame of the plurality of video frames of the second fragment.

5. The system of claim 1, wherein the second instructions, when executed by the one or more processors of the second computing device, further cause the second computing device to calculate an estimated live-point time of the first computing device, wherein the estimated live-point time corresponds to a time the first computing device most recently updated the playlist to indicate that at least one new fragment of the video content is available from the first computing device.

6. The system of claim 5, wherein the second instructions, when executed by the one or more processors of the second computing device, cause the second computing device to:
calculate an estimated current time of the first computing device; and
calculate the estimated live-point time by subtracting (i) the age of the playlist from (ii) the estimated current time of the first computing device.

7. The system of claim 6, wherein the second instructions, when executed by the one or more processors of the second computing device, cause the second computing device to calculate the estimated current time of the first computing device by subtracting (i) half of a response latency associated with a request for the playlist from (ii) a time the second computing device received the playlist.

8. The system of claim 5, wherein the second instructions, when executed by the one or more processors of the second computing device, cause the second computing device to select the scheduled playback time by applying an offset to the estimated live-point time.

9. The system of claim 1, wherein the second instructions, when executed by the one or more processors of the second computing device, cause the second computing device to modify the second fragment by adjusting a duration for which a video frame of the plurality of video frames of the second fragment is displayed.

10. The system of claim 9, wherein:
the duration is equal to a reciprocal of a framerate associated with the video content; and
the second instructions, when executed by the one or more processors of the second computing device, cause the second computing device to adjust the duration by adding to or subtracting from a denominator of the reciprocal.

11. A non-transitory computer-readable storage medium storing instructions that, when executed by one or more processors, cause:
receiving, from a content provider, video content comprising at least a first fragment and a second fragment, wherein the first fragment and the second fragment each comprise a plurality of video frames;
receiving, from the content provider, a value indicating an age of a playlist that indicates at least one of the first fragment or the second fragment is available from the content provider;
selecting a scheduled playback time for the first fragment based on the age of the playlist;
determining that an actual playback time of the first fragment is different from the scheduled playback time; and
modifying, based on a difference between the scheduled playback time and the actual playback time, the second fragment.

12. The non-transitory computer-readable storage medium of claim 11, wherein the instructions, when executed by the one or more processors, cause the modifying the second fragment by causing at least one of:
adding one or more video frames to the second fragment; or
removing one or more video frames from the second fragment.

13. The non-transitory computer-readable storage medium of claim 12, wherein:
the adding the one or more video frames to the second fragment is based on determining that the actual playback time is before the scheduled playback time; and
the removing the one or more video frames from the second fragment is based on determining that the actual playback time is after the scheduled playback time.

14. The non-transitory computer-readable storage medium of claim 12, wherein the adding the one or more video frames to the second fragment comprises repeating playback of at least one video frame of the plurality of video frames of the second fragment.

15. The non-transitory computer-readable storage medium of claim 11, wherein the instructions, when executed by the one or more processors, further cause calculating an estimated live-point time that corresponds to a time the playlist was most recently updated to indicate that at least one new fragment of the video content is available from the content provider.

16. The non-transitory computer-readable storage medium of claim 15, wherein:

the instructions, when executed by the one or more processors, further cause calculating an estimated current time of a video content server associated with the content provider; and the instructions, when executed by the one or more processors, cause the calculating the estimated live-point time by causing subtracting (i) the age of the playlist from (ii) the estimated current time of the video content server.

17. The non-transitory computer-readable storage medium of claim 16 wherein the instructions, when executed by the one or more processors, cause the calculating the estimated current time of the video content server by causing subtracting (i) half of a response latency associated with a request for the playlist from (ii) a time the playlist was received from the content provider.

18. The non-transitory computer-readable storage medium of claim 15, wherein the instructions, when executed by the one or more processors, cause the selecting the scheduled playback time by causing applying an offset to the estimated live-point time.

19. The non-transitory computer-readable storage medium of claim 11, wherein the instructions, when executed by the one or more processors, cause the modifying the second fragment by causing adjusting a duration for which a video frame of the plurality of video frames of the second fragment is displayed.

20. The non-transitory computer-readable storage medium of claim 19, wherein:
the duration is equal to a reciprocal of a framerate associated with the video content; and
the adjusting the duration comprises adding to or subtracting from a denominator of the reciprocal.

21. A device comprising:
one or more processors; and
memory storing instructions that, when executed by the one or more processors, cause the device to:
receive, from a content provider, video content comprising at least a first fragment and a second fragment, wherein the first fragment and the second fragment each comprises a plurality of video frames;
receive, from the content provider, a value indicating an age of a playlist that indicates at least one of the first fragment or the second fragment is available from the content provider;
select a scheduled playback time for the first fragment based on the age of the playlist;
determine that an actual playback time of the first fragment is different from the scheduled playback time; and
modify, based on a difference between the scheduled playback time and the actual playback time, the second fragment.

22. The device of claim 21, wherein the instructions, when executed by the one or more processors, cause the device to modify the second fragment either by adding one or more video frames to the second fragment or by removing one or more video frames from the second fragment.

23. The device of claim 22, wherein the instructions, when executed by the one or more processors, cause the device to add the one or more video frames to the second fragment based on determining that the actual playback time is before the scheduled playback time or remove the one or more video frames from the second fragment based on determining that the actual playback time is after the scheduled playback time.

24. The device of claim 22, wherein the instructions, when executed by the one or more processors, cause the device to add the one or more video frames to the second fragment by repeating playback of at least one video frame of the plurality of video frames of the second fragment.

25. The device of claim 21, wherein the instructions, when executed by the one or more processors, cause the device to calculate an estimated live-point time of the content provider, wherein the estimated live-point time corresponds to a time the content provider most recently updated the playlist to indicate that at least one new fragment of the video content is available from the content provider.

26. The device of claim 25, wherein the instructions, when executed by the one or more processors, cause the device to:
calculate an estimated current time of the content provider; and
calculate the estimated live-point time by subtracting (i) the age of the playlist from (ii) the estimated current time of the content provider.

27. The device of claim 26, wherein the instructions, when executed by the one or more processors, cause the device to calculate the estimated current time of the content provider by subtracting (i) half of a response latency associated with a request for the playlist from (ii) a time the device received the playlist.

28. The device of claim 25, wherein the instructions, when executed by the one or more processors, cause the device to select the scheduled playback time by applying an offset to the estimated live-point time.

29. The device of claim 21, wherein the instructions, when executed by the one or more processors, cause the device to modify the second fragment by adjusting a duration for which a video frame of the plurality of video frames of the second fragment is displayed.

30. The device of claim 29, wherein:
the duration is equal to a reciprocal of a framerate associated with the video content; and
the instructions, when executed by the one or more processors, cause the device to adjust the duration by adding to or subtracting from a denominator of the reciprocal.

* * * * *

UNITED STATES PATENT AND TRADEMARK OFFICE
CERTIFICATE OF CORRECTION

PATENT NO. : 10,924,787 B2  
APPLICATION NO. : 16/005953  
DATED : February 16, 2021  
INVENTOR(S) : Neill Kipp Page 1 of 1

It is certified that error appears in the above-identified patent and that said Letters Patent is hereby corrected as shown below:

In the Specification

Column 5, Detailed Description, Line 6:  
Please delete "HTMLS," and insert --HTML5,--

Column 26, Detailed Description, Line 2:  
Please delete "810,812," and insert --810, 812,--

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*